(12) United States Patent
Picard et al.

(10) Patent No.: US 12,073,281 B2
(45) Date of Patent: Aug. 27, 2024

(54) HUB-AND-SPOKE INVENTORY MANAGEMENT SYSTEM

(71) Applicant: HIS Company, Inc., Houston, TX (US)

(72) Inventors: Nelson Picard, Houston, TX (US); Jonathan Haigler, Houston, TX (US)

(73) Assignee: HIS COMPANY, INC., Houston, TX (US)

( * ) Notice: Subject to any disclaimer, the term of this patent is extended or adjusted under 35 U.S.C. 154(b) by 0 days.

(21) Appl. No.: 18/187,469

(22) Filed: Mar. 21, 2023

(65) Prior Publication Data

US 2024/0078395 A1 Mar. 7, 2024

Related U.S. Application Data

(60) Provisional application No. 63/404,288, filed on Sep. 7, 2022.

(51) Int. Cl.
*G06K 7/10* (2006.01)
*G06Q 10/087* (2023.01)

(52) U.S. Cl.
CPC ....... *G06K 7/10297* (2013.01); *G06Q 10/087* (2013.01)

(58) Field of Classification Search
CPC ....... G06K 7/10297; G06K 2017/0051; G06Q 10/08; G06Q 10/087; G06Q 10/0875

(Continued)

(56) References Cited

U.S. PATENT DOCUMENTS 8,049,621 B1 11/2011 Egan
8,077,041 B2 12/2011 Stern et al.
(Continued)

FOREIGN PATENT DOCUMENTS

CN 101689256 B 3/2010

OTHER PUBLICATIONS

PCT/US2023/065053—International Search Report and Written Opinion of International Searching Authority, dated Jul. 13, 2023, 10 pages.

(Continued)

*Primary Examiner* — Edwyn Labaze
(74) *Attorney, Agent, or Firm* — Nolte Lackenbach Siegel

(57) ABSTRACT

A hub-and-spoke radio frequency identification ("RFID") inventory management system includes a distributed information-handling architecture together with consolidated access to system-wide information through cloud services. The system allows each supplier, hub, and point-of-use ("POU") user interface to have consolidated access, visibility, analysis, and on-demand reporting of RFID data along with inventory management services implemented by one or more cloud services platforms. The cloud services can be provisioned on item-by-item, user-by-user, facility-by-facility bases in accordance with a hierarchical permission-based access system. The cloud services generally include, for example, a system of inventory management dashboards customizable to provide the specific inventory management information most pertinent for each user, supplier, hub, and POU. Item stocking MIN and MAX values for each item at each level are established and changed from time-to-time as deemed appropriate for each item stocked by each supplier, hub, and POU.

20 Claims, 13 Drawing Sheets

(58) Field of Classification Search
USPC .......................... 235/385, 375, 487; 705/28
See application file for complete search history.

(56) References Cited

U.S. PATENT DOCUMENTS

| | | |
|---|---|---|
| 8,321,302 B2 | 11/2012 | Bauer et al. |
| 10,037,509 B1 | 7/2018 | Huebner et al. |
| 10,318,921 B1 | 6/2019 | Tilly |
| 11,157,871 B1 | 10/2021 | Seol et al. |
| 2007/0124216 A1 | 5/2007 | Lucas |
| 2009/0109004 A1 | 4/2009 | Van Alestyne |
| 2009/0219823 A1* | 9/2009 | Qian .................. H04L 41/0866 370/250 |
| 2011/0035327 A1 | 2/2011 | Benda |
| 2014/0035724 A1 | 2/2014 | Rothschild |
| 2019/0280755 A1 | 9/2019 | Tim et al. |
| 2020/0161742 A1* | 5/2020 | Leitermann ............ G16H 40/20 |
| 2022/0036305 A1* | 2/2022 | Glick ................ G06Q 10/0834 |
| 2022/0219904 A1* | 7/2022 | Lert, Jr. .................. B65G 1/10 |

OTHER PUBLICATIONS

Xemelgo Case Study, "Powering New Business Models with HISCO", dated Jun. 30, 2021, 1 page.

\* cited by examiner

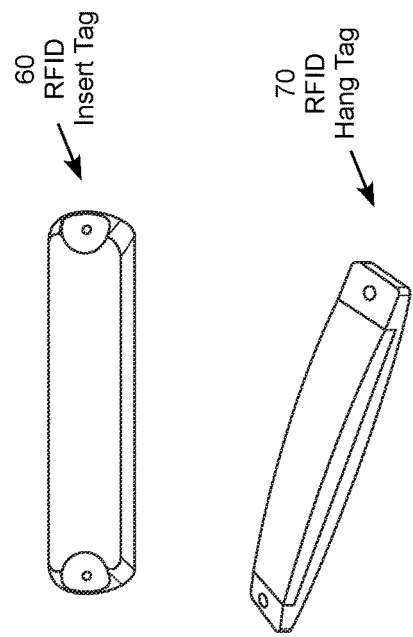
FIG. 4
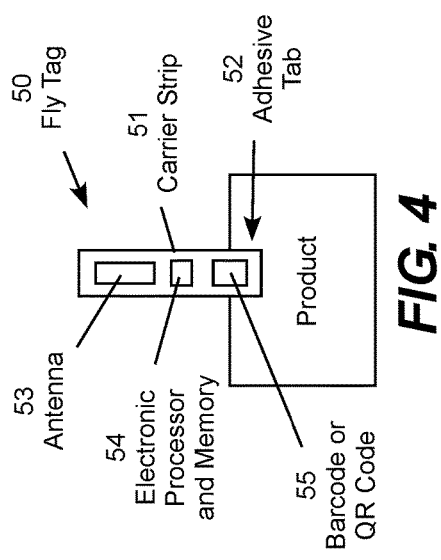
FIG. 5
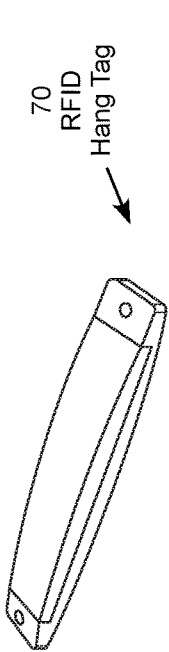
FIG. 6
FIG. 7
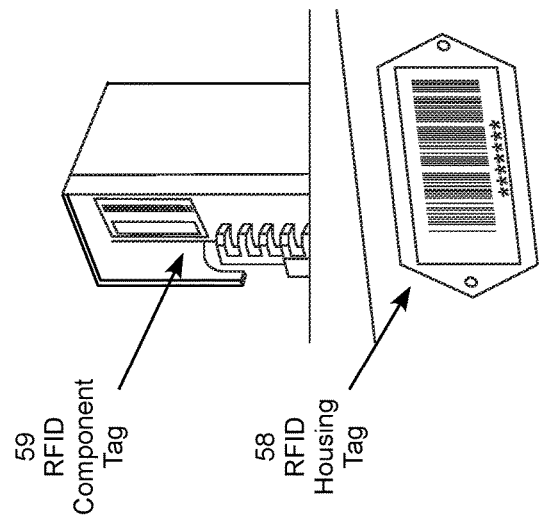
FIG. 8

HUB-AND-SPOKE INVENTORY MANAGEMENT SYSTEM

CROSS-REFERENCE TO RELATED APPLICATIONS

This application is claims priority to U.S. Prov. Appl. No. 63/404,288 filed on Sep. 7, 2022, the contents of each are hereby incorporated by reference to the extent not inconsistent with the present disclosure. All applicable rights are claimed including the right of priority.

TECHNICAL FIELD

The present invention is directed to radio frequency identification ("RFID") systems and, more particularly, to a hub-and-spoke inventory management system providing RFID tracking and inventory management services to component stocking ("hub") as well as distributed point-of-use ("spoke") manufacturing facilities.

BACKGROUND

This section of this document introduces information about and/or from the art that may provide context for or be related to the subject matter described herein and/or claimed below. It provides background information to facilitate a better understanding of the various aspects of the technology described below. This is a discussion of "related" art. That such art is related in no way implies that it is also "prior" art. The related art may or may not be prior art. The discussion in this section of this document is to be read in this light, and not as admissions of prior art.

Inventory management is an important function in the manufacture and distribution of a wide range of complex products containing large numbers of individual component parts. Many of these component parts are separately sourced from a wide range of different suppliers, shipped, temporarily stocked, and transshipped in complex logistical supply chains. There is an ongoing need to efficiently manage these supply chains to ensure the components are efficiently brought together at various manufacturing sites on an as-needed basis to support the ongoing consumption of the components in the manufacturing and distribution process. Manufacturing operations can be brought to a halt due to an inadequate supply of a single component, while many forces beyond the control of the manufacturer can unexpectedly slow or interrupt the flow of essential components.

Changes in end-use product sales and inventory levels impact the need for component parts throughout the logistical supply chain. Inventory management systems have therefore been developed to efficiently source and track critical components as they are ordered and transit various points in the logistical supply, manufacturing, distribution, and sale chains. Radio frequency identification ("RFID") electronic tags and reader systems have become an indispensable part of managing large, and in many cases worldwide, logistical supply chains. For example, U.S. Pat. Nos. 11,010,710; 8,321,302; and 8,077,041, which are incorporated by reference, describe systems for using RFID tags and readers to implement various aspects of inventory management for manufacturing logistical supply chains.

Many useful RFID technologies have been developed to aid in inventory and supply chain management including a variety of different types of RFID readers capable of reading a variety of different RFID tags, individually and in bulk. A range of fixed, vehicle-mounted, and handheld RFID readers can be strategically deployed throughout product shipping, handling, and manufacturing areas. Each reader can gather RFID tag information continuously or on demand. For example, a single RFID reader can read all of the RFID tags on a number of components inside a single manufactured product. Conventional RFID readers can also read all of the RFID tags on a number of finished products packaged into cases palletized for shipping, all of the RFID tags on pallets as they arrive or exit a loading dock or other designated shipping point, all of the RFID tags in a storage area, "crib" or shelving unit where bulk products or component parts are staged, all of the RFID tags on a cart passing through an ingress-egress reader positioned next to a door, all of the RFID tags in a cart or basket passing through a payment check-out station, all of the RFID tags inside a truck or other shipping container, and so forth. The result is an extremely rich supply of RFID tag information available on a zone, finished product, and component basis.

While powerful for gaining information from a wide range of RFID tags, these conventional RFID systems do not, by themselves, provide features for visualizing, reporting, and managing all of the available RFID data into effective inventory and supply chain management systems. There is, therefore, a continuing need for more functional, effective, and less costly systems for integrating large quantities of RFID tag data into effective systems for mapping, ordering, tracking, and providing visibility for strategically, effectively, and efficiently managing end-to-end inventory and supply chain systems.

SUMMARY

The present invention meets the need described above through hub-and-spoke radio frequency identification ("RFID") inventory management systems. A representative embodiment includes one or more cloud services platforms in communication one or more hub systems, each with one or more hub RFID readers, which may communicate through one or more access points, and a large number of RFID tags attached to inventory items present at the hub facility. The system also includes multiple point-of-use ("POU") systems, each installed at a POU facility including one or more RFID readers, which may communicate through one or more access points, and a large number of RFID tags attached to inventory items present at the POU facility. The hub and POU systems are interconnected by an inter-facility communication network, such as the Internet, allowing the system users to access a variety of cloud services implemented by the cloud services platforms. For example, the cloud services platforms maintain item stocking MIN values, MAX values, and item count values for each item managed at each hub and POU facility. The cloud services platforms display a number of user interfaces providing user access, visibility, analysis, and on-demand reporting of RFID data along with inventory management services implemented by the cloud services platforms on individual tracked item, individual facility, and other consolidated bases.

Another optional feature of the representative embodiments involves one or more supplier systems installed at one or more supplier facilities. Like the hub and POU systems, each supplier system includes one or more RFID readers, which may communicate through one or more access points, and a large number of RFID tags attached to inventory items present at the supplier facility. The supplier systems are likewise interconnected with the cloud services platforms by the inter-facility communication network, and likewise provide user access, visibility, analysis, and on-demand reporting of RFID data collected by each supplier RFID reader on individual tracked item, individual facility, and consolidated bases. The combined features enable end-to-end inventory management services and visibility into component MIN, MAX and current count inventory levels, analysis, and on-demand reporting, from multiple suppliers through multiple hubs to multiple POUs, on individual tracked item, individual facility, and other consolidated bases.

As a specific example, each POU facility may be a manufacturing plant assembling finished products or assemblies from component parts stocked at the supplier, hub, and POU levels. The cloud services typically include on-demand reporting of the item stocking MIN values, MAX values, and current count values levels for each tracked item stocked at the supplier, hub, and POU levels on individual tracked item, individual facility, and other consolidated bases. The cloud services include a system of inventory management dashboards customizable to provide the specific information pertinent for each user, supplier, hub, and POU facility. In various embodiments, RFID readers may include loading dock RFID readers, storage crib RFID readers, ingress-egress RFID readers, pole-mounted RFID readers, ceiling-mounted RFID readers, wall-mounted RFID readers, storage crib RFID readers, vehicle-mounted RFID readers, handheld RFID readers, and other types of RFID readers deemed suitable for specific applications.

It will be understood that specific embodiments may include a variety of features and options in different combinations, as may be desired by different users. Practicing the invention does not require utilization of all, or any particular combination, of these specific features or options. The specific techniques and structures for implementing particular embodiments of the invention and accomplishing the associated advantages will become apparent from the following detailed description of the embodiments and the appended drawings and claims.

The above presents a simplified summary in order to provide a basic understanding of some aspects of the invention. This summary is not an exhaustive overview of the invention. It is not intended to identify key or critical elements of the disclosure or to delineate the scope of the invention. Its sole purpose is to present some concepts in a simplified form as a prelude to the following more detailed description, appended drawings, and claims.

BRIEF DESCRIPTION OF THE FIGURES

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 4 is an illustration of an RFID fly tag.

FIG. 5 is an illustration of housing and component RFID tags.

FIG. 6 is an illustration of an RFID insert tag.

FIG. 7 is an illustration of an RFID hang tag.

FIG. 8 is an illustration of RFID adhesive tags.

Figure 1:
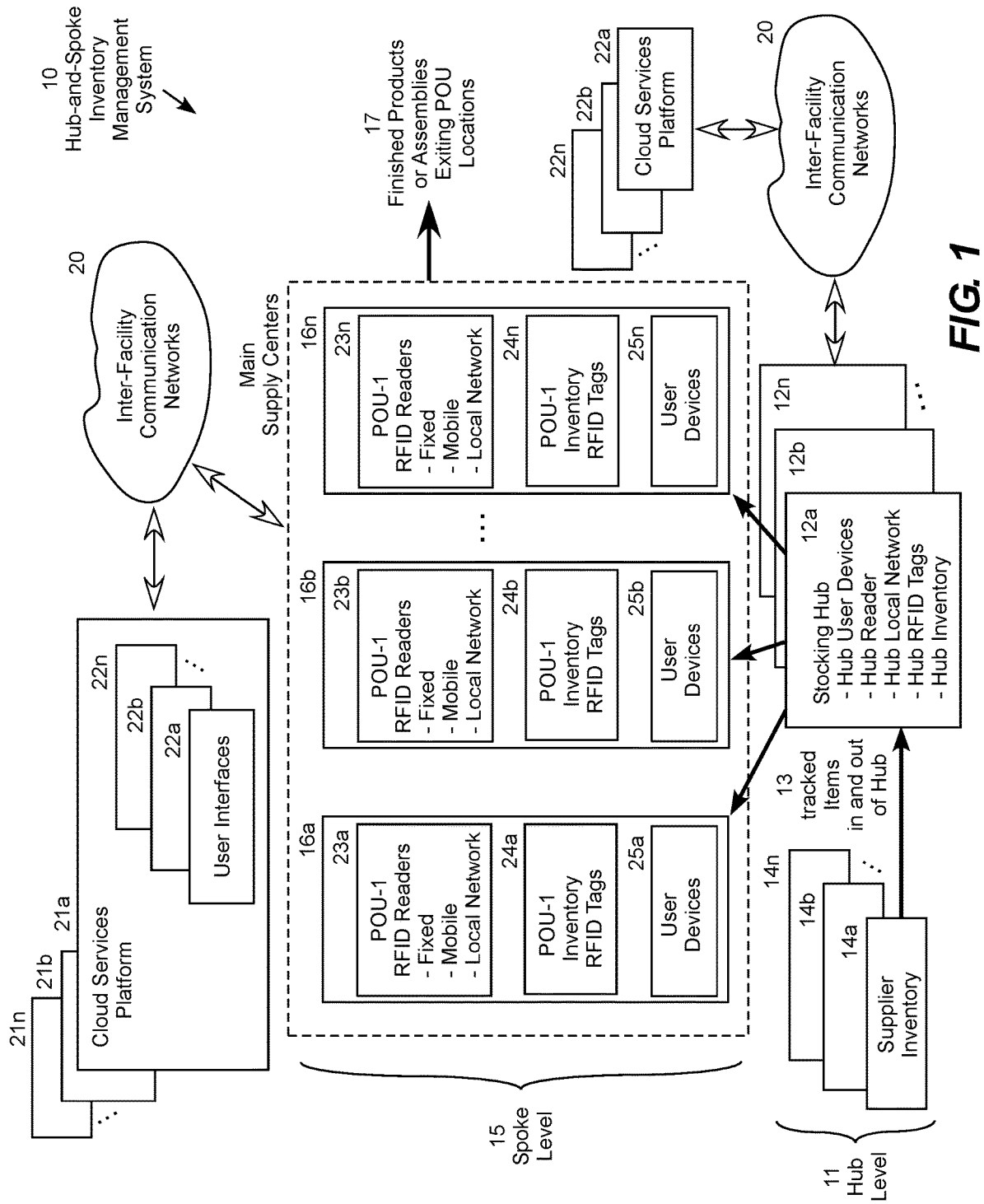
FIG. 1 is a functional block diagram of a hub-and-spoke inventory management system.

While the invention is susceptible to various modifications and alternative forms, the drawings illustrate representative embodiments of the invention by way of example. It should be understood, however, that the description of specific examples is not intended to limit the invention to the particular forms disclosed, but on the contrary, the intention covers all modifications, equivalents, and alternatives falling within the spirit and scope of the invention as defined by the appended claims.

DESCRIPTION OF ILLUSTRATIVE EMBODIMENTS

Embodiments of the present invention include radio frequency identification ("RFID") hub-and-spoke inventory management systems including a distributed information-handling architecture together with consolidated access to system-wide information through cloud services. The system allows each point-of-use ("POU"), and each individual user interface to have consolidated access, visibility, analysis, and on-demand reporting of RFID data along with inventory management services implemented by one or more cloud services platforms. The inventory management system may optionally be extended to hub, supplier, components source, sub-contractor, distribution warehouse, retail floor plan, and other levels of the logistical supply chain as deemed appropriate for different enterprises. The cloud services can be provisioned on user-by-user, item-by-item, facility-by-facility, level-by-level, and other consolidated bases in accordance with a hierarchical permission-based security access system.

The cloud services generally include, for example, a system of inventory management dashboards customizable to provide the specific inventory management information most pertinent for each user, user group, logistical level, POU, hub, supplier, and other target audiences as configured for different enterprise systems. Item stocking MIN and MAX values for each tracked item at each POU are established and changed from time-to-time as deemed appropriate for each tracked item stocked by each POU, which may optionally be extended to additional levels of the logistical supply chain, such each supplier component source, supplier, hub, freight carrier, distribution warehouse, sub-contractor, retail floor plan, and other players in the logistical supply chain. The cloud services platforms issue Advance Shipping Notices ("ASNs") upon automatic placement of replenishment orders in accordance with the MIN-MAX inventory control parameters. As an option, the cloud services platforms may also issue Completed Shipping Notices ("CSNs") upon confirmation of actual receipt of the shipped items by the designated recipients. The cloud services provide visibility of the MIN-MAX values, current item count levels, ASNs, optional CSNs, and other inventory management information to authorized user devices in accordance with the permissions configured in the security access system. RFID data and inventory management services are made available visible on per-item, per-user, per-shipment, per-facility, and other consolidated bases in accordance with conditions and access limitations maintained and implemented by the security access system.

In general, the system 10 may or utilize different types of location and status indicators as may be desired by different enterprise users. For example, each product may have a "home base" identifier indicating the position where the tracked item is presently located, such as "Supplier-X," "Hub-X," "POU-X," and so forth. As another option, additional more specific areas within each facility may be named and used as location identifiers for tracked items present in those locations. For example, additional status identifiers may indicate physical locations within any of these facilities, such as "loading dock-X," "storage crib-X," "assembly bay-X," and so forth. As yet another option, additional status identifiers may be defined for other entities in the supply chain that may have custody of tracked items, such as "freight carrier-X," "sub-contractor-X," "distribution warehouse-X," "retail floor plan-X," and so forth.

In another optional feature, additional pre-defined "status identifiers" may be used to indicate the handling status as the tracked items move from facility to facility in the logistical supply chain. For example, at the POU level additional status identifiers may be defined for "on order," "in transit," and "on hand" at the POU. Additional status identifiers may optionally be expanded to include additional layers of the logistical supply chain, such as such as "supplier-X inventory," "ordered from supplier-X," "in transit from supplier-X," "hub-X inventory," "ordered from hub-X," "in transit from hub-X," "staged for shipping from hub-X," staged for shipping from POU-X," "in transit from hub-X," "in transit from POU-X," "received by sub-contractor-X," "on hand at distribution warehouse-X," "received by customer-X," and other suitable identifiers as may be desired by different systems users.

A system of inventory management dashboards customizable on user-by-user and facility-by-facility bases communicate with the cloud service platforms to provide authorized user devices with visibility into inventory management parameters for tracked item, such as MIN values, MAX values, and item count values on status-identifier-specific, item-specific, facility-specific or other consolidated bases. The system of user interfaces for accessing the cloud services may be customized and regulated on user-by-user, credential-by-credential, facility-by-facility and other desired bases to provide hierarchical, permission-based fixed and mobile access to the inventory management information maintained by the cloud services platforms. The mobile apps also facilitate an additional range of strategic services, such as navigable inventory floor maps illustrating item locations, lost or missing item location, inventory stocking procedures, pre-shipment inventory checking, recalled and expired audit procedures, and the like.

Reference will now be made in detail to embodiments of the invention. In general, the same or similar reference numerals are used in the drawings and the description to refer to the same or like parts or steps. The drawings are in simplified form and are not to precise scale unless specifically indicated. The words "couple" and similar terms do not necessarily denote direct and immediate connections, but also include connections through intermediate elements or devices. Certain descriptors, such "first" and "second," "top and bottom," "upper" and "lower," "inner" and "outer," or similar relative terms may be employed to differentiate structures from each other. These descriptors are utilized as a matter of descriptive convenience and are not employed to implicitly limit the invention to any particular position or orientation.

FIG. 1 is a functional block diagram of a hub-and-spoke inventory management system 10, which provides comprehensive product and component visibility throughout the spoke level 15 of a distributed logistical supply chain suitable for use by a manufacturer of complex finished products with a high number of individually sourced, stocked, and tracked components parts. The hub-and-spoke inventory management system may optional be extended to supplier, hub, distribution, carrier freight, customer, and other levels of the logistical supply chain as desired by different enterprises. The basic structure is a hub level 11, with one or more stocking hubs 12a-12n that initially receive and stock a potentially large number of tracked items 13 from a potentially large number of suppliers 14a-14n. The stocking hubs 12a-12n maintain inventories of the tracked items 13 and ship the items on an as-ordered basis to the spoke level 15, which includes a potentially large number of point-of-use ("POU") facilities 16a-16n, such as manufacturing plants, where the items are stored and "consumed" as the items are incorporated into finished products or assemblies 17 ultimately exiting the POU facilities, typically through loading docks and other designated shipping points.

The hub-and-spoke inventory management system 10 includes a wide range of RFID tags readers, and user devices configured to access online inventory management services providing comprehensive management, tracking and visibility of the tracked items 13 as they are sourced and move through the supply chain, manufacturing, and distribution process, referred to generally as "cloud services" provided by cloud services platforms 21a-21n accessed over the inter-facility communication networks 20. The cloud services platforms 21a-21n, individually or collectively, expose a rich system of user interfaces 22a-22n providing tracked item visibility, inventory management, and on-demand reporting services to a wide range of system users. The cloud services typically include inventory management dashboards, MIN-MAX and current item levels, Advanced Shipping Notices (ASNs), optional Completed Shipping Notices (CSNs), item expiration databases, recalled item databases, and other information customize for different users, user groups, facilities, and enterprises. The cloud services are provided on a user-by-user, item-by-item, facility-by-facility, level-by-level, and other consolidated bases in accordance with a hierarchical permission-based security access system.

In the illustrated embodiment, the stocking hubs 12a-12n, suppliers 14a-14n, and POU facilities 16a-16n access the cloud services by user interfaces 22a-22n exposed by the cloud services platforms 21a-21n, which receive RFID data from readers at the various facilities. The user interfaces 22a-22n provide the system users with visibility and optionally the ability to enter and change data, as appropriate, through the cloud services accessed over the inter-facility communication networks 20. The operator of the cloud services platforms 21a-21n, and optionally selected users of the cloud services, have access to RFID data, inventory management services, and permissions to make changes to the cloud services on a hierarchical basis managed by the information technology teams under the direction of enterprise management. The manufacturing enterprise, or an outside vendor, and a combination of system stakeholders may own, operate and/or maintain the cloud services platforms 21a-21n, as desired by different enterprises.

At the spoke level 15, the POUs 16a-16n typically operate a large number of fixed and mobile RFID readers 23a-23n, which read RFID tags 24a-24n and relay the RFID data to the cloud services platforms 21a-21n the local networks and the inter-facility networks 20. Users at the POUs obtain visibility of the RFID data and associated inventory management services through the cloud services accessed by user devices 25a-25n assigned to authorized users integrated into the system 10. As an option, the stocking hubs 12a-12n at the hub level 11 may implement an additional level of hub-and-spoke inventory management including a similar or scaled down version of the spoke level 15 systems deployed at the POUs described above. For example, each hub system may include one or more user devices, local networks, RFID readers, and a large number of RFID tags attached to tracked items at the hub facility.

As another option, the suppliers 14a-14n may implement another additional level of the hub-and-spoke inventory management system 10 including a similar or scaled down version of the spoke level 15 described above. For example, each supplier system may include one or more user devices, local networks, RFID readers, and a large number of RFID tags attached to tracked items on site at the supplier. As yet another option, the hub-and-spoke inventory management system 10 may be extended to additional levels of the logistical supply chain upstream from the suppliers 14a-14n, such as component sources providing the supplier with their source materials, and the like. Additionally or alternatively, the system 10 can be extended to additional downstream levels of the logistical supply chain, such as sub-contractors, distribution warehouses, retail floor plans, customer unsold inventories. Similarly, the system may be further extended to additional levels of intermediaries, such as freight carriers and all other custodians of the tracked items to construct a comprehensive end-to-end inventory visibility, tracking, and management system.

The cloud services platforms 21a-21n typically issue Advance Shipping Notices ("ASNs") indicating the initiation and completion of shipping orders for tracked items 13 going from the stocking hubs 12a-12n to the POUs 16a-16b. The cloud services platforms 21a-21n may optionally issue Confirmed Shipping Notices ("CSNs") confirming receipt of the tracked items 13 buy the intended POU recipients. The POUs, in turn, maintain item inventories on a MIN-MAX basis, which automatically cause the cloud services platforms 21a-21n to place a replenishment order with the appropriate stocking hub(s) 12a-12n whenever the POU's inventory of an item reaches its assigned MIN value sufficient to replenish the item to its assigned MAX value.

As an option, the cloud services platforms 21a-21n may similarly issue ASNs and optional CSNs for items going from the suppliers 14a-14n to the stocking hubs 12a-12n, which may be extended to additional levels of the system 10, as desired by different enterprises. Accordingly, the hubs 12a-12n may likewise maintain item inventories on a MIN-MAX basis, which automatically cause the cloud services platforms 21a-21n to place an order with the supplier(s) 14a-14n whenever the stocking hub's inventory of an item reaches its assigned MIN value sufficient to replenish the item to its assigned MAX value. As another option, the suppliers 14a-14n may similarly maintain inventories of their components used to fabricate items they supply to the hubs on a MIN-MAX basis, which automatically cause the cloud services platforms 21a-21n to place an order with a component source whenever the supplier's inventory of the component reaches its assigned MIN value sufficient to replenish the component to its assigned MAX value. It will be appreciated that this automated stocking process on a MIN-MAX basis may be extended to additional levels of a complex logistical supply chain, as may be desired for different manufacturing processes.

Item stocking MIN and MAX values for each item at each level of the logistical supply chain are established and changed from time-to-time as deemed appropriate for each tracked item stocked by the POU. In addition, the inventory and item supply needs of the POU facilities 16a-16n may be managed on a consolidated basis to ensure that items required to meet the consolidated needs of the spoke level 15 are sufficiently supplied, in view of the overall financial and logistical situation, to meet the forecast requirements for items at the consolidated hub level 11. Optionally, this consolidated inventory management process may be extended to the hubs 12a-12, the suppliers 14a-14n, the suppliers' component sources, the freight carriers, the distribution warehouses, sub-contractors, retail floor plans, and so forth, through as many levels of the logistical supply chain as desired.

Each POU facility 16a-16n generally operates its own local network, RFID readers 23a-23n, and RFID tags 24a-24n attached to its tracked item inventory, which are visible to the user devices 25a-25n, which may be located on-site and at other locations through the cloud services accessed over the inter-facility communication networks 20. As an option, each stocking hub 12a-12n may also maintain its own local network, RFID readers, and RFID tags attached to its tracked item inventory, which are visible to the user devices located on-site and at other locations through the cloud services. As another option, each supplier 14a-14n may operate its own local network, RFID readers, and RFID tags attached to its tracked item inventory, which are visible to the on-site user located on-site and at other locations through the cloud services. This architecture may be extended to other levels and participants in the hub-and-spoke inventory management system 10, as desired by different enterprises.

The distributed information-handling architecture of the hub-and-spoke inventory management system 10, together with consolidated access to system-wide information through the cloud services via the user interfaces 22a-21n, allows each supplier, hub, POU and other authorized user to have consolidated access, visibility, analysis, and on-demand reporting of RFID data along with inventory management services implemented by the cloud services platforms 21a-21n. The cloud services can be provisioned on a user-by-user or facility-by-facility basis in accordance with a hierarchical permission-based access system. The cloud services generally include, for example, a system of inventory management dashboards customizable to provide the specific inventory management information most pertinent for each user, supplier, hub, and POU. Similarly, item stocking MIN and MAX values for each item are established and changed from time-to-time as deemed appropriate for each item stocked by each supplier, hub, and POU. The cloud services include the Advance Shipping Notices ("ASNs"), and may include optional Completed Shipping Notices ("CSNs"), visible on per-item, per-shipment, per-facility, and other consolidated bases.

The backbone of the hub-and-spoke inventory management system 10 includes the large number of RFID readers automatically transmitting the RFID data to the cloud services platforms 21a-21n exposing the user interfaces 22a-22n, which provide the cloud services to the user devices 25a-25n over the on-site local networks and the inter-facility communication networks 20. The system stake holders obtain visibility to RFID data and inventory management services through the system of user interfaces providing access to cloud services consolidating RFID data and associated inventory management services running on the cloud services platforms. The cloud services may be configured for access on user-by-user and facility-by-facility bases on a hierarchical, permission-based access security system.

The inter-facility communication networks 20 may include the Internet, the overhead data channels of the public switched telephone network, proprietary telecommunication data channels, satellite links, and other suitable long-distance data networks. The local network typically include a selection of access points, relay points, wifi routers, hot spots, cellular modems, ethernets, power-over-ethernet (PoE) devices, DHCP servers, gateways, data switches, and other suitable network operations and management components as may be deployed in different network configurations. Fixed user devices are typically configured to access the cloud services over the local networks to interconnect with the inter-facility communication networks. Mobile user devices can generally use these same facilities for online connectivity, while often having flexibility to directly interconnect with the inter-facility communication networks, bypassing the local networks when accessing the cloud services. The cloud services platforms 21a-21n may be general purpose, specially programmed network computing devices. Although the cloud services platforms 21a-21n are depicted as located at facilities separate from the hub, POS and supplier facilities, they may be located at any desired location in the "cloud" including, for example, as controllers in one or more of the hub, POS, supplier, or other inventory stocking facilities. The user devices 25a-25n may be general purpose, specially programmed fixed or mobile monitoring stations, computer workstations, laptop computers, tablets, mobile smartphones, wearable computers, and other enterprise and personal computing devices suitable for accessing the cloud services. The user devices run application programs, mobile apps, device drivers, and other specially programmed software to access the cloud services over the local and inter-facility networks.

Figure 2:
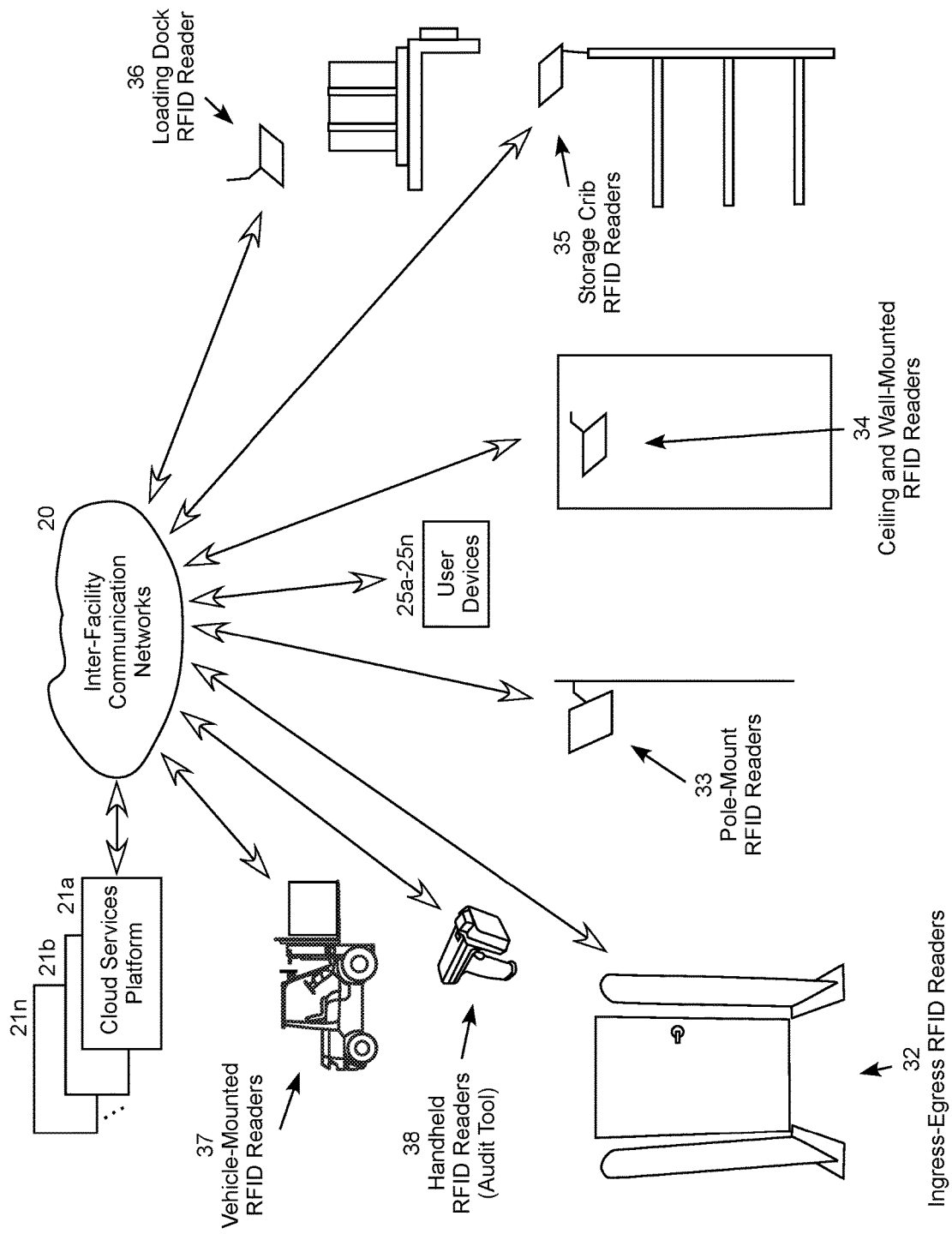
FIG. 2 is a conceptual illustration of RFID tag reading in the hub-and-spoke inventory management system.

FIG. 2 is a conceptual illustration of RFID tag reading in the hub-and-spoke inventory management system 10. The RFID readers 32-38 communicate RFID tag data to the cloud services platforms 21a-21n via the site's local network and the inter-facility communication networks 20. The user devices 25 the RFID data and associated inventory management services through the user interfaces 22a-22n exposed by the cloud services platforms 21a-21n. The user devices 25a-25n access the user interfaces 22a-22n via inter-facility communication networks 20, which may or may not rely on the site's local network depending on the connection mode of the user device. In general, the RFID readers typically include mobile handheld and vehicle mounted readers, as wells as fixed readers dedicated to loading dock and storage area readers where products are typically received, stored, and staged for shipping out of the facilities. Similarly, the user devices may include fixed, vehicle mounted, and mobile computing devices, as desired by different enterprises.

Representative types of fixed RFID readers include ingress-egress readers 32, such as door pass-through readers that read all of the RFID tags that pass between a pair of upright standing readers. Other examples of fixed readers include pole-mounted RFID readers 33, ceiling and wall mounted RFID readers 34, storage crib RFID readers 35 and loading dock RFID readers 36. Representative types of mobile readers include vehicle-mounted RFID readers 37 and handheld RFID readers 38. Ingress-egress and loading dock readers are well suited to scanning items into and out of inventory as they enter and leave a facility on a scheduled or authorized basis. The pole, wall and storage crib readers are well suited for maintaining ongoing surveillance and inventory tracking of all RFID tags within a controlled location, such as a storage or assembly location. The mobile RFID readers are well suited to specialized tasks, such as inventory audits, finding misplaced or lost items, and identifying recalled or expired items or lots. It will be appreciated that the depicted types of RFID readers are merely illustrative and other types of RFID readers may be utilized as a matter of design choice.

Figure 3:
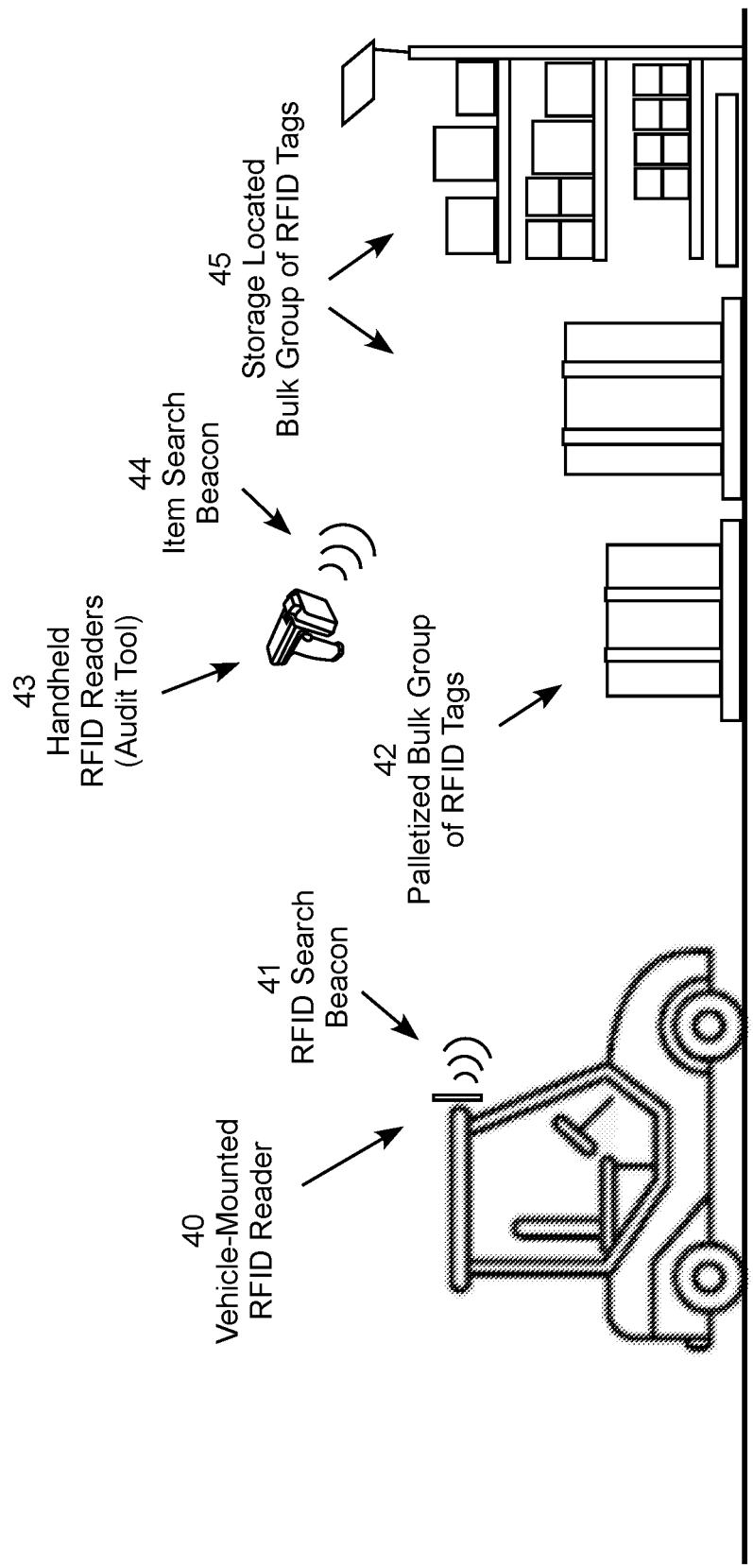
FIG. 3 is a conceptual illustration of bulk RFID tag reading in the hub-and-spoke inventory management system.

FIG. 3 is a conceptual illustration of bulk RFID tag reading in the hub-and-spoke inventory management system 10. In this example, a vehicle mounted RFID reader 40 stores specific tag IDs or other information of interest defining the search criteria. The RFID reader emits an RFID search beacon 41, analyzes the responses received from the illuminated RFID tags, and emits, displays, and/or transmits an alert when the search criteria is satisfied, much like a metal detector. Alternatively, a person may walk the plant floor with a handheld RFID reader 43 performing the same types of searches. For example, the search criteria may specify one or more lost items, expired items, recalled items, items from a specific manufacturer, items listed in ASNs or CSNs, or other desired criteria to assist in location the specified items. If the search criteria specifies a lost item found in the search, the cloud services recognize that the lost item has been found and "scanned in," discontinues the search for the recovered lost item, may reinstate the tag ID in the inventory management system if the tag ID was previously "consumed," and may increment the current on-hand item count for the item if decremented for the previously lost item.

It will be appreciated that a wide range of item searches may be conducted, such as a search for tags in a specific lot of tags, all tags with expired expiration dates, all tags on items subject to one or more recalls, all tags for a specific type of item, all tags for items received into the facility in a specific shipment, all tags for items received into the facility from a specific supplier, all items received into the facility within a specific data range, all tracked items designated to leave the facility in a specific shipment, and so forth. It will be appreciated that these particular RFID search strategies are merely illustrative and other RFID search strategies may be designed and utilized as a matter of search design choice.

FIGS. 4-8 are illustrations of typical types of RFID tags. Each RFID tag may be a Global Standard (e.g., "GS1") label identifying a unique company code for its associated item referred to as the Serial Shipping Container Code ("SSCC"). Optionally each tag generally carries a printed identifier, such as a barcode and/or QR code, in addition to the electronic identifier encoded EPC in the RFID circuit. FIG. 4 shows a fly tag 50, which includes a carrier strip 51 carrying an adhesive tab 52 positioned to be stuck to an item with the antenna 53 disposed up into the air for convenient reading by an RFID reader. This example fly tag 50 also includes an electronic processor and memory 54 containing data transmitted by the antenna 53 when the antenna is illuminated by an RFID reader using the energy emitted by the RFID reader to power the response transmitted by the by tag 50. This particular fly tag 50 also includes a printed barcode or QR code 55 containing all or a portion of the information stored the electronic memory readable by a different type of reader, such as an optical scanner. The memory on each RFID tag contains a variety of information, such as the tag identifier (e.g., EPC or serial number), lot number, manufacturer ID, product name, product serial number, expiration date, etc. In general, a handheld or other RFID reader involved in a search for a specific tag does not need to execute sophisticated item location software, it can simply receive a tag ID of interest and alert the user when it discovers that particular tag, similar to a metal detector.

To provide additional representative examples, FIG. 5 is an illustration of a housing RFID tag 58 and component RFID tag 59. In general, any finished product or assembly may have a top-level tag for the product or assembly and a number component and sub-component tags for items contained within the finished product or assembly. FIG. 6 is an illustration of an RFID insert tag 60 which may, for example, be adhered to an item or attached by a cable tie. FIG. 7 is an illustration of an RFID hang tag 70 with a pair of holes used to attach the tag to items with ties or lanyards, and FIG. 8 is an illustration of RFID adhesive label tags 80. It will be appreciated that the depicted types of RFID readers are merely illustrative and other types of RFID readers may be utilized as a matter of design choice.

Figure 9:
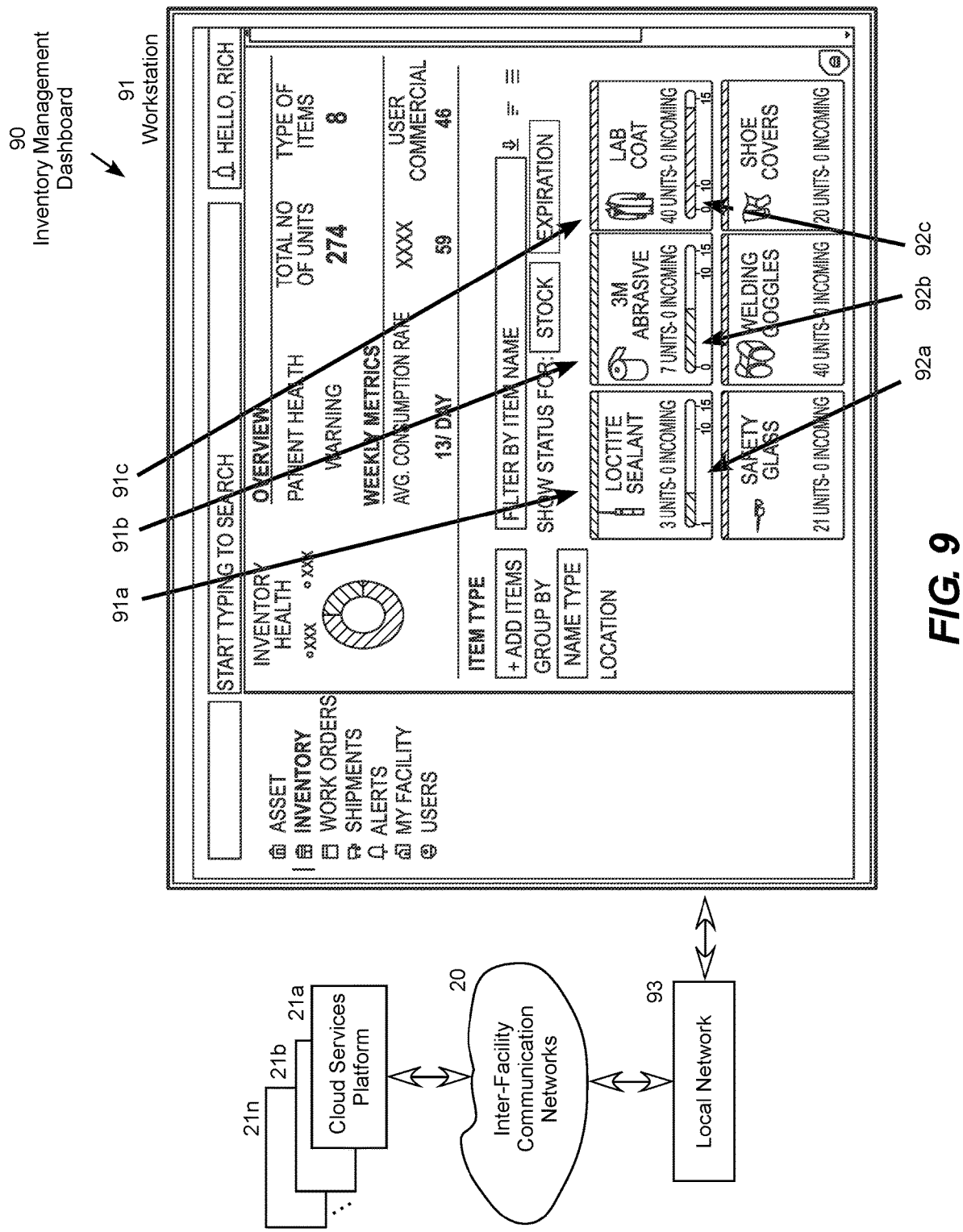
FIG. 9 is a conceptual illustration of an inventory management dashboard in the hub-and-spoke inventory management system.

FIG. 9 is a conceptual illustration of an inventory management dashboard 90 running on a workstation 91 in the hub-and-spoke inventory management system 10. In this representative embodiment, the workstation 91 communicates with the cloud services platforms 21a-21n via the site's local network 93 (e.g., ethernet, PoE ethernet) and the Internet. The dashboard 90 provides a range of cloud services provided by the cloud services platforms 21a-21n through user interfaces accessed over the inter-facility communication networks 20 by user devices, which are represented in this specific example by the workstation 91. The representative inventory management dashboard 90 provides consolidated access, visibility, analysis, and on-demand reporting of RFID data along with inventory management services implemented throughout the system. The cloud services can be provisioned on a user-by-user or facility-by-facility basis in accordance with a hierarchical permission-based access system. This particular example of the dashboard 90 includes pictorial representations 91a, 91b and 91c of selected items on-hand along with graphic representations 92a, 92b and 91c of the MIN values, MAX values, and current item count value for each selected item on-hand at the selected facility. User selections allow the user to view different items on-hand at the selected facility, similar information for the products on-hand at other supplier, hub and facilities, and similar information on a consolidated basis.

Figure 10:
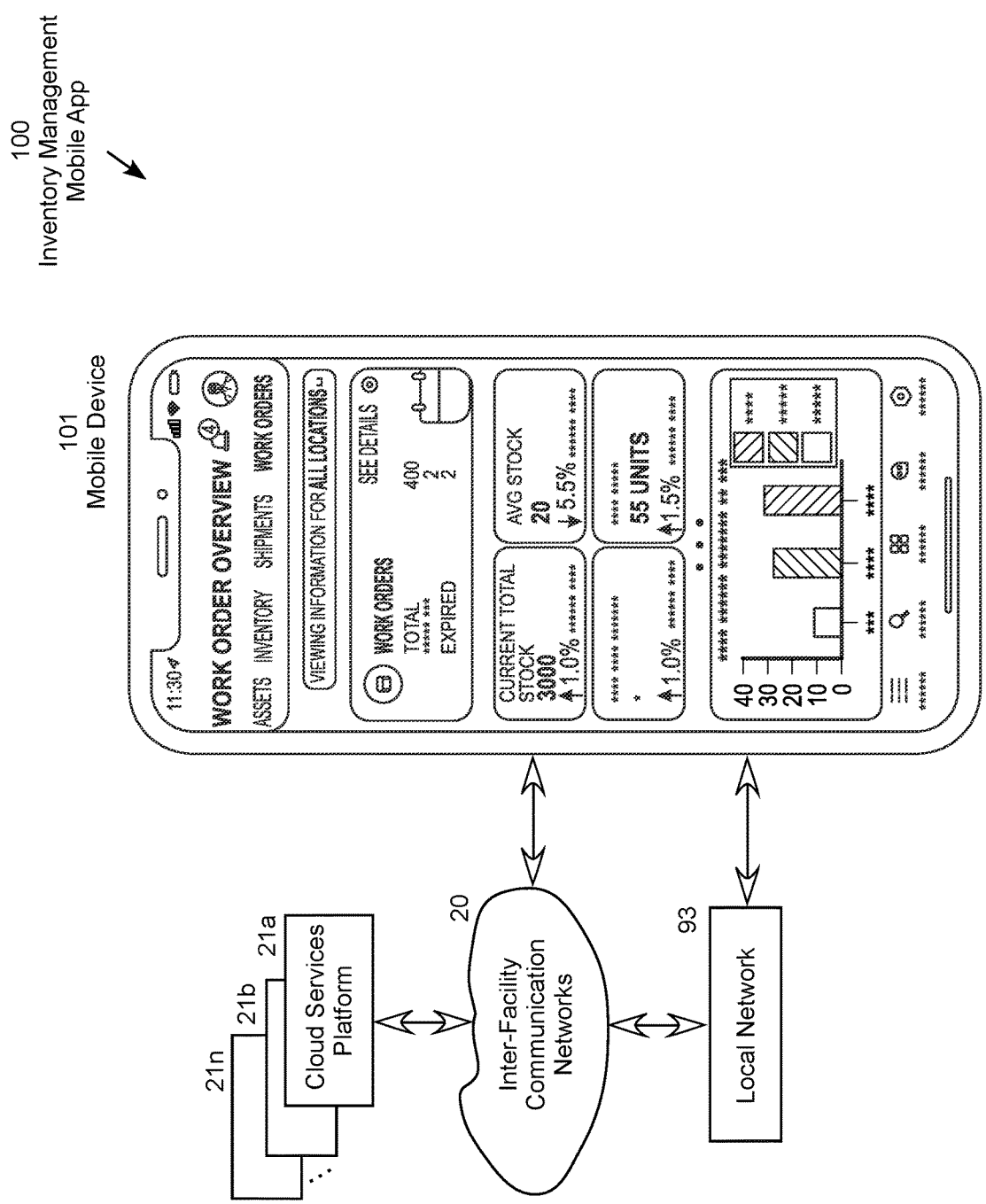
FIG. 10 is a conceptual illustration of an inventory management mobile app in the hub-and-spoke inventory management system.

FIG. 10 is a conceptual illustration of an inventory management mobile app 100 running on a mobile device 101, such as a smartphone, in the hub-and-spoke inventory management system 10. In this embodiment, the mobile device 101 communicates with the cloud services platforms 21a-21n via the site's local network 93 and one of the inter-facility communication networks 20, such as the Internet. In some cases, mobile device 101 may have the flexibility to bypass the local network 93 and communicate directly with the one of the inter-facility communication networks 20, such as an overhead mobile telecommunication data channel or satellite link. The mobile app 100 is customizable on user-by-user and facility-by-facility bases to provide mobile access to the same inventory management information as the dashboard systems. The mobile apps facilitate an additional range of strategic services, such as navigable inventory floor maps illustrating item locations, lost or missing item location, inventory stocking procedures, pre-shipment inventory checking, recalled and expired audit procedures, and the like.

Figure 11:
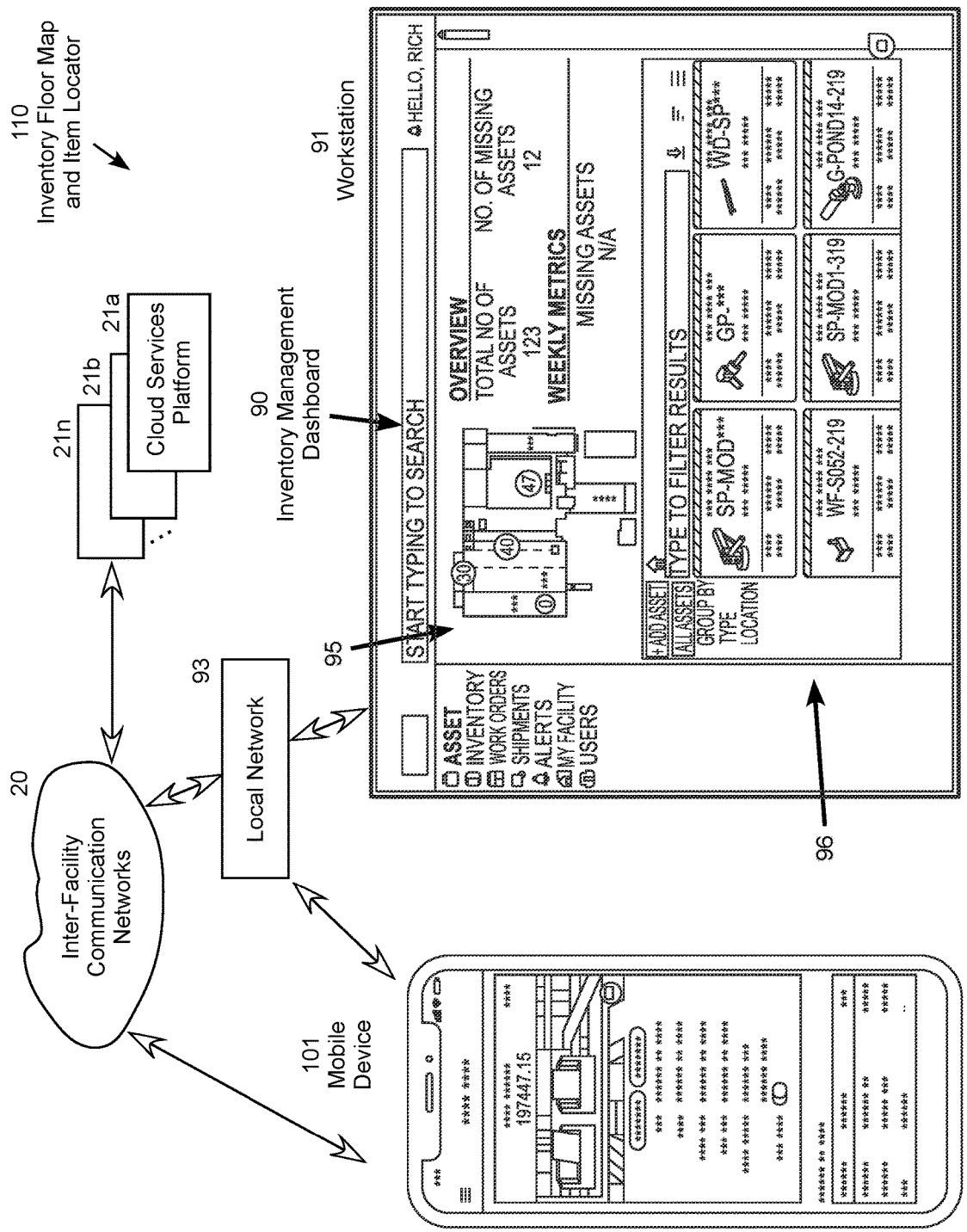
FIG. 11 is a conceptual illustration of an inventory floor map and item locator feature in the hub-and-spoke inventory management system.

For example, FIG. 11 illustrates an inventory item locator feature 110 including a floor map 95 and pictorial representations 96 of the items located at a selected facility in the hub-and-spoke inventory management system. In this example, the inventory management dashboard 90 running on the workstation 91 accesses the cloud services running on the cloud services platforms 21a-21n. The workstation 91 works independently or in concert with a mobile device mobile device 101, which are both in communication with the cloud services platform 12a-12n through the local network 93 and the inter-facility communication network 20. In this example, the inventory management dashboard 90 may identify a specific item to be located and a floor map indicating the location of the item. The mobile device 101 also displays the inventory floor map along with the location of the mobile device guiding the user to the location of the desired item.

As an optional feature, the inventory management dashboard 90 may also access, and transmit to the mobile device 101, a "drill down" set of graphical information system layers associated with the specific item to be located, such as a picture of an example of the item in its typical packaging, a picture of the item removed from its typical packaging, a picture of the shipping information that is supposed to be carried on the item, credentials, diagnostic information, and tools that may be required to interrogate or repair the specific item. Other example information that may be provided through the mobile app includes manufacture contact information, item specification sheets, assembly diagrams, hazard material information, applicable notices, warning, and so forth. It will be appreciated that these examples of types of information that may be accessed through the mobile app are merely illustrative and other types of information, analysis and reports may be provided as a matter of design choice.

FIGS. 12-17 are flow chart for a variety of inventory management processes. Although these processes can generally be performed by any controller in the hub-and-spoke inventory management system, a cloud services platform providing inventory management services at a POU facility. The same item-by-item tracking features are generally applied at the hub level and can be extended to the supplier and other levels in the system 10. Each computing device in the hub-and-spoke inventory management system includes general purpose computer components including a processor, a computer readable storage medium storing non-transitory computer-executable instructions, and network access and management equipment that, when executed by the processor, causes the controller to perform operations described in the flow charts and elsewhere in this disclosure. The processor may be, for example, a central processing unit ("CPU"), sometimes referred to as a controller, microcontroller, processor or similar designation, together with other motherboard, computer bus, random access memory, solid state or other non-volatile memory, peripheral device drivers, and interface components typically included in general purpose, specially programmed user devices, network devices, and cloud computing platforms.

Figure 12:
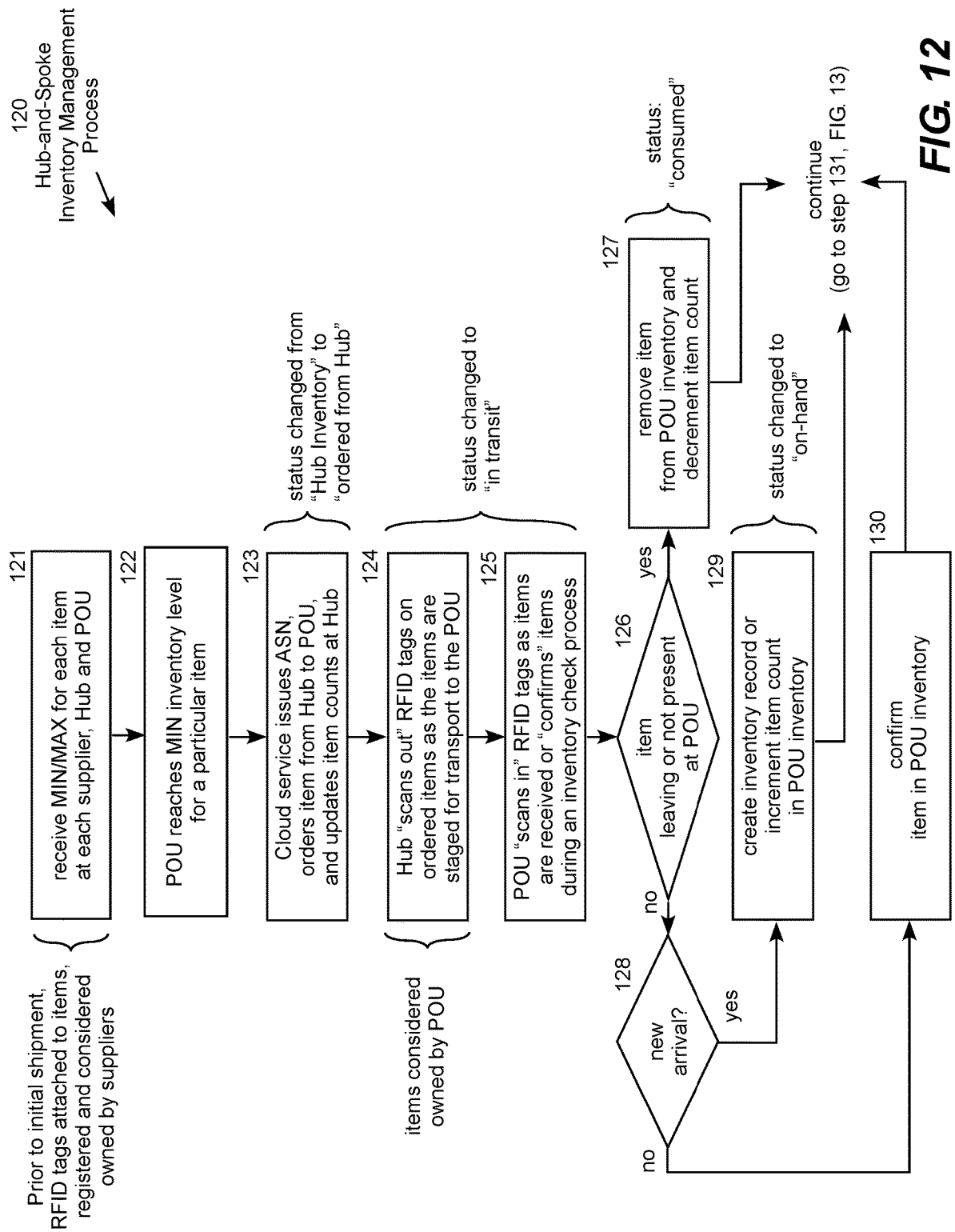
FIGS. 12-13 show a logic flow diagram illustrating a hub-and-spoke inventory management system.
Figure 13:
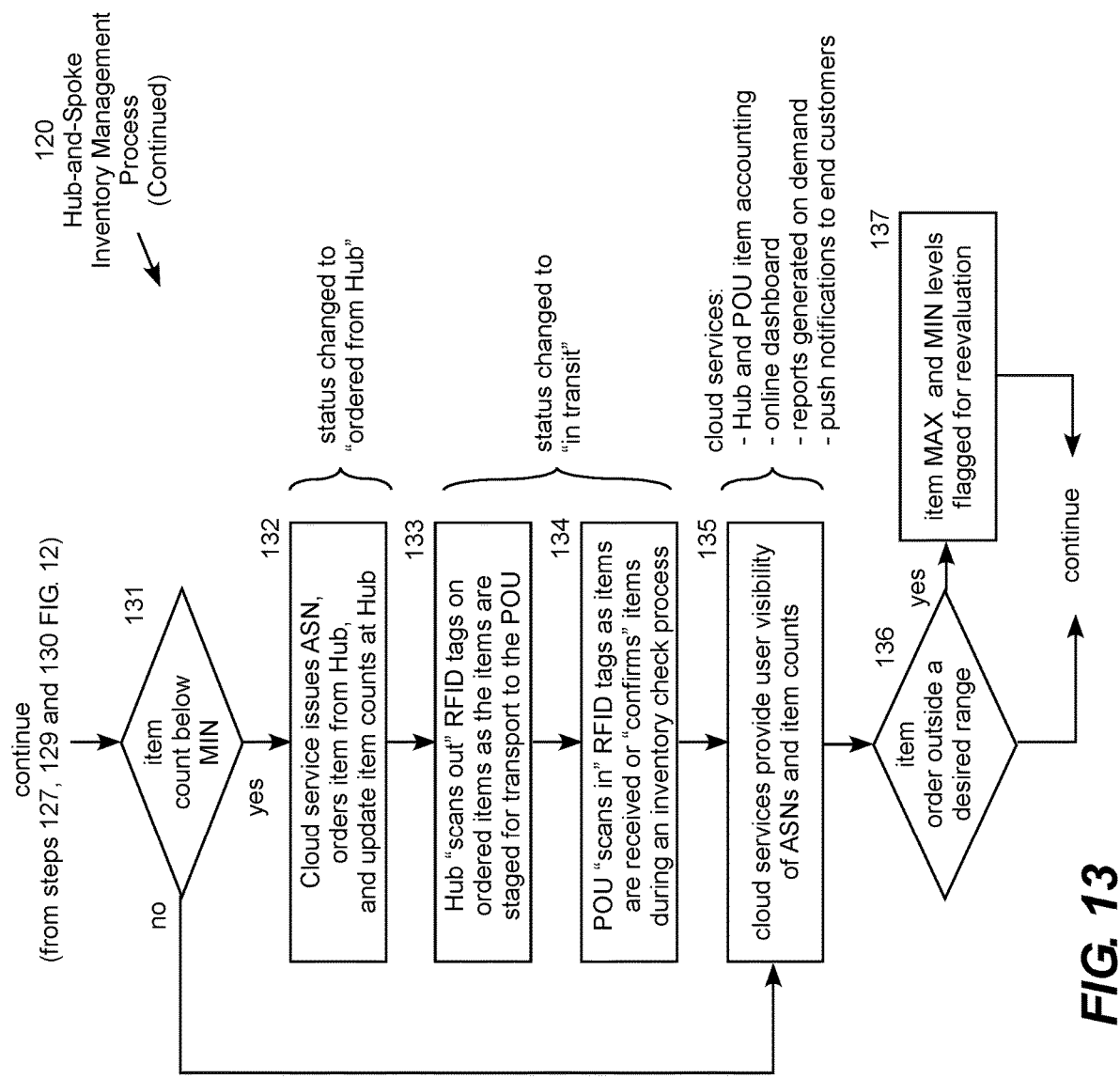

FIGS. 12-13 are a logic flow diagram of a hub-and-spoke inventory management process 120, which is implemented cloud services platforms 21a-21n in the system 10 shown in FIG. 1. In step 121, each controller is associated with a POU location in the cloud services that contains MIN and MAX inventory parameters for each item to be stocked at its associated facility. In this representative process, RFID tags are attached to items by the suppliers, who also register the RFID tags along with the information contained on the tags, prior to shipping items to the hubs. At this point in the process, the items are considered owned by the suppliers. All Advance Shipping Notice ("ASNs"), optional Completed Shipping Notices ("CSNs"), in-transit tracking information, MIN and MAX inventory values, and current item count values at all supplier, hub, and POU facilities in the system may be visible to authorized system users, and available for viewing, analysis and on-demand reporting through the cloud services.

Step 121 is followed by step 122, in which a representative POU reaches a MIN inventory level for a particular item tracked by the system. Step 122 is followed by step 123, in which the cloud service controller issues a "replenishment order" in the form of an ASN for the item to the appropriate stocking hub to replenish the level of the item to its assigned MAX level. The cloud service controller updates the item count at the hub to remove the ordered items from the hub inventory. As an option, at this point a "status identifier" for the ordered items may be changed from "hub inventory" to "ordered from hub" to inform system users of the changed status of the items. Step 123 is followed by step 124, in which the hub "scans out" the RFID tags on the ordered items as they are staged for shipment or transferred into the freight carrier's custody, for example at a loading dock or other dedicated shipping point under RFID reader surveillance. At this point the items' "status identifier" is typically changed to "in transit" from the hub to the POU. As another option, the shipped items may be "scanned in" to the freight carrier as they are "scanned out" of the hub shipping point to maintain a chain of custody record. As yet another option, the shipping container may be scanned continually at one or more dedicated check points along the shipping route to confirm the integrity of the shipment as it makes the journey from the hub to the POU.

Step 124 is followed by step 125, in which the POU "scans in" the RFID tags on the ordered items as they are received, for example at a loading dock or other dedicated shipping point under RFID reader surveillance. At this point a "status identifier" is typically changed from "in transit" to "on hand" at the POU facility. At this point, the items are considered "owned" by the POU facility. Alternatively, if the POU scans an RFID tag for an item already in its inventory, the "on hand" status is confirmed in the item's inventory record. Inventory confirmation generally takes place at multiple places in the POU facility as each tracked item is monitored when it is received into, moves from place to place within, and is ultimately scanned out of the POU facility. As an option, items initially received at the POU facility may be "scanned out" of the freight carrier custody as they are "scanned in" to the POU at the loading dock or other designated receiving point. As another option, the cloud services platform may issue a Completed Shipping Notice ("CSN") once the items are scanned into the POU facility indicating safe receipt of the ordered items at the POU facility. All ASNs, CSNs, MIN values, MAX values and current item counts values at all facilities in the inventory management system can be made visible to authorized system users through the cloud services.

Step 125 is followed by step 126, in which the cloud services platform determines whether a scanned item is identified for shipping from the POU, or whether an item listed in the POU's inventory has been confirmed as not present at the POU facility. If the item is slated to leave or is confirmed as not present at the POU facility, the "yes" branch is followed to step 127, in which the cloud services platform removes the item from the POU inventory by changing the item status to "consumed" and decrementing the item count in the POU inventory. Referring again to step 126, if the item is confirmed as present and is not designated to leave the POU, the "no" branch is followed to step 128, in which the cloud services platform determines whether the scanned item is a new arrival.

If the scanned item is a new arrival "scanned in" to the POU system, the "yes" branch is followed to step 129, in which the cloud services platform creates an inventory record for the item or increments the item count in the POU inventory, as appropriate. If the scanned item is not a new arrival, the "no" branch is followed to step 129, in which the cloud services platform "confirms" the item in the POU inventory. Each tag's scanning history, including the "scanned in" new arrival status date and location within the POU facility, each change in status including the date and location of status change, each confirmation of presence within the facility including the date and location of the confirmation within the facility, and the "scanned out" date and location within the facility is typically recorded on a tag-by-tag basis in the inventory management system. Steps 127, 128, and 130 are continued at step 131 shown in FIG. 13.

As additional options, as with items ordered by the POUs, the cloud services platforms may implement similar inventory management services for source component sources, suppliers, hubs, distribution warehouses, sub-contractors, retail floor plans, and other stakeholders in the logistical supply chain. The items may be "scanned out" from each custodian, and "scanned in" to the next custodian, including each freight carrier transporting the tracked items from level to level through the hub-and-spoke inventory management system 10. Again, the items may be typically tracked by the freight carrier while in transit with links to the in-transit tracking information incorporated into the item inventory records in the hub-and-spoke inventory management system. As with other levels in the logistical supply chain, the RFID tags may be read continually by vehicle mounted RFID readers while in transit or by fixed or handheld RFID readers at designated locations along the way.

Referring to FIG. 13, steps 127, 129, and 130 shown on FIG. 12 are followed by step 131, in which the cloud services platform determines whether the item count for the scanned item is below the MIN value set for the item. If the item count for the scanned item is below the MIN value set for the item, the "yes" branch is followed to step 132, in which the cloud services platform places an order with a hub stocking that item (or multiple hubs if necessary to source the required quantity) to bring the item count up to its designated MAX value. The cloud services platform also issues an ASN for the order and changes the item status to "ordered from hub." Step 132 is followed by step 133, in which in which the hub "scans out" the RFID tags on the ordered items as they are staged for shipment or transferred into the freight carrier's custody, for example at a loading dock or other dedicated shipping point under RFID reader surveillance. At this point the items' "status identifier" is typically changed to "in transit" from the hub to the POU. As another option, the shipped items may be "scanned in" to the freight carrier as they are "scanned out" of the hub shipping point to maintain a chain of custody record. As yet another option, the shipping container may be scanned continually at one or more dedicated check points along the shipping route to confirm the integrity of the shipment as it makes the journey from the hub to the POU.

Step 133 is followed by step 134, in which the POU "scans in" the RFID tags on the ordered items as they are received, for example at a loading dock or other dedicated shipping point under RFID reader surveillance. At this point a "status identifier" is typically changed from "in transit" to "on hand" at the POU facility. At this point, the items are considered "owned" by the POU facility. Step 134 is followed by step 135, in which the cloud services platform provides user visibility of the ASN and the updated item count at the POU facility through the cloud services.

As an option, at step 135 the cloud services platform may also provide the POU's customer(s) of the effected end product(s) and/or other interested parties outside the hub-and-spoke inventory management system with a "push notification" of the ASN in accordance with configuration settings. To prevent double counting or double ordering of items, the current item count is updated item count at shipping hub and the receiving POU facility upon issuance of the ASN. As another option, if the receipt confirmation features is activated, updating the current item count at the receiving POU may be deferred until issuance of a Completed Shipping Notice ("CSN") confirming actual receipt of the items at the POU facility. In addition, as another option, if the item freight tracking feature is activated, the user interfaces 22a-22n provide visibility of the items as they are tracked while in freight carrier custody. As the current item counts are updated for the hub and the POU facilities, the updated values are reflected in the item, hub and POU item accounting current item counts made visible to the system users through the online dashboards, on-demand reporting, and other features of the system 10.

As another option, step 135 may be followed by step 136, in which the cloud services platform determines whether the item order was outside a desired range. For example, the item order may have been unusually large or unusually small, indicating that the current MAX or MIN designations are not set to efficient levels. As another example, known or anticipated logistical bottlenecks, pricing changes, or seasonal fluctuation may suggest that management should take a closer look at the MAX and MIN settings. If the cloud services platform determines the item order was outside a desired range, the "yes" branch is followed to step 137, in which the item MAX and MIN values are flagged for reevaluation. Step 137 and the "no" branch step 136 ae followed by ongoing continuation of the hub-and-spoke inventory management process.

Figure 14:
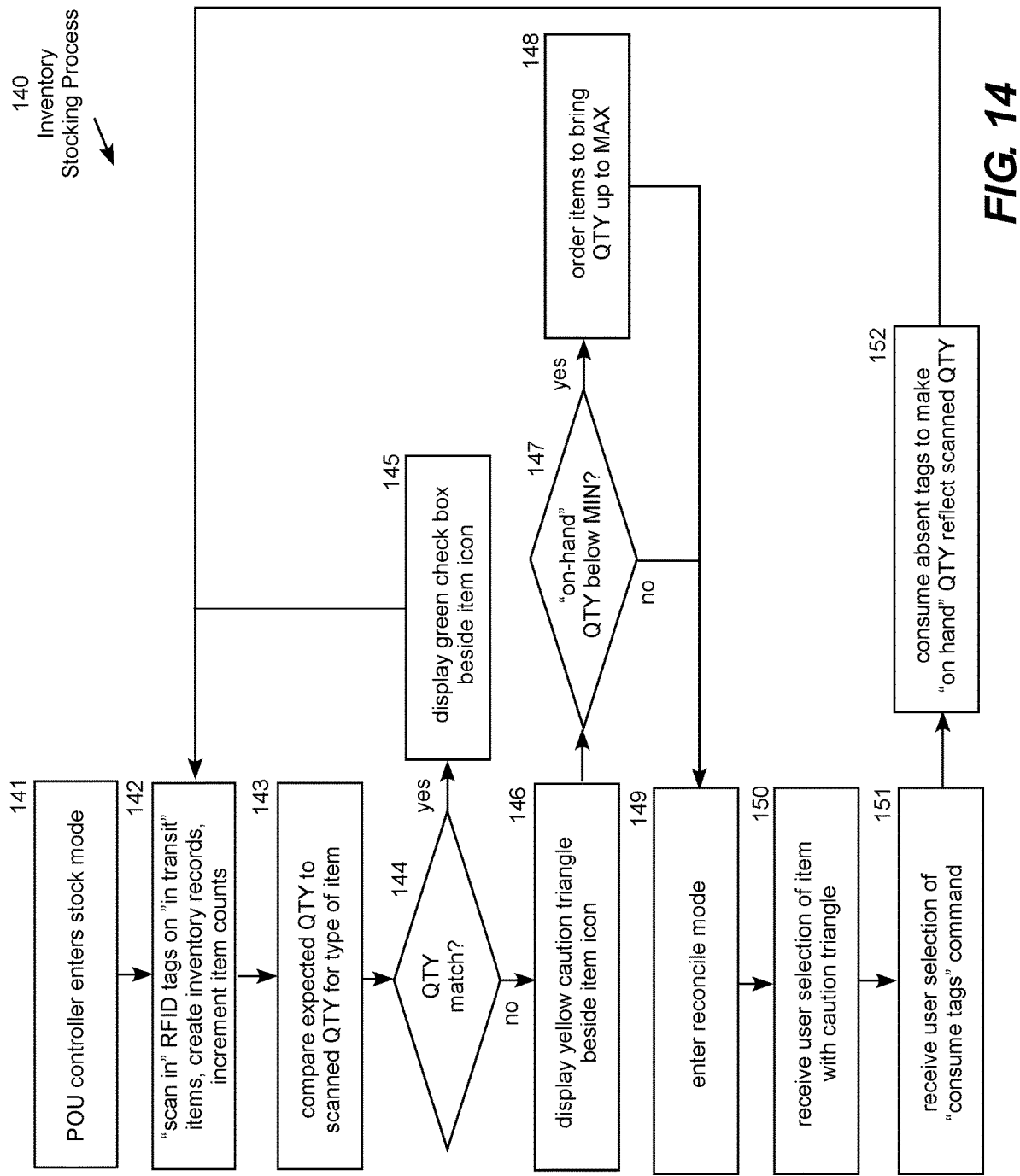
FIG. 14 is a logic flow diagram illustrating an inventory stocking process in the hub-and-spoke inventory management system.

FIG. 14 is a logic flow diagram 140 for an inventory stocking process in the hub-and-spoke inventory management system. In step 141, the cloud services platform enters a "stocking mode" utilized for scanning newly arrived items into inventory. Step 141 is followed by step 142, in which the cloud services platform "scans in" the RFID tags on the "in transit" items that have arrived at the POU facility, typically at a loading dock or other designated reception point monitored with RFID scanners. The cloud services platform creates new inventory records or increments item counts, as appropriate, for the scanned items. Step 142 is followed by step 143, in which the cloud services platform compares the "expected quantity" to the "scanned quantity" for a particular type of item typically by comparing the ASN for the shipment to the scanned quantity for the particular type of item. Step 143 is followed by step 144, in which the POU determines whether the scanned quantity matches the expected quantity for the particular type of item. If the scanned quantity matches the expected quantity for the particular type of item, the "yes" branch is followed to step 145, in which the cloud services platform displays a green check box beside an icon corresponding to the type of item.

Referring again to step 144, if the scanned quantity does not match the expected quantity for the particular type of item, the "no" branch is followed to step 146, in which the cloud services platform displays a yellow "caution" triangle beside the icon corresponding to the type of item. Step 146 is followed by step 147, in which the cloud services platform determines whether the "on-hand" quantity based on the scanned quantity actually received is below the MIN value designated for the type of item. If the "on-hand" quantity is below the MIN value, the "yes" branch is followed to step 148, in which the cloud services platform orders a sufficient number of the items to bring the quantity up to the MAX value designated for the item. The cloud services platform also issues an ASN, changes the items status to "on order from hub," and may send push notifications to interested parties, in accordance with configuration settings.

Step 148 is followed by step 149, in which the cloud services platform enters a "reconciliation mode" to address the expected tags not actually received, which were previously entered into the inventory management system by the hub that sent the shipment with the missing items. Step 149 is followed by step 150, in which the cloud services platform receives a user selection corresponding to a type of item displaying a yellow caution triangle. Step 150 is followed by step 151, in which the cloud services platform receives a user selection of a "consume tags" selection item. Step 151 is followed by step 152, in which the cloud services platform "consumes" the absent tags to make the "on-hand" quantity of the type of item reflect the actual scanned quantity and otherwise delete the missing items from the inventory management system. The cloud services platform may also initiate additional reporting and investigation steps, such as sending push notifications to POU facility management, the shipping hub, and the freight carrier of the discrepancy to determine what happened to the absent tags and take corrective action. After step 152, the process loops back to step 142, in which additional "in transit" items as "scanned in" to the POU facility.

Figure 15:
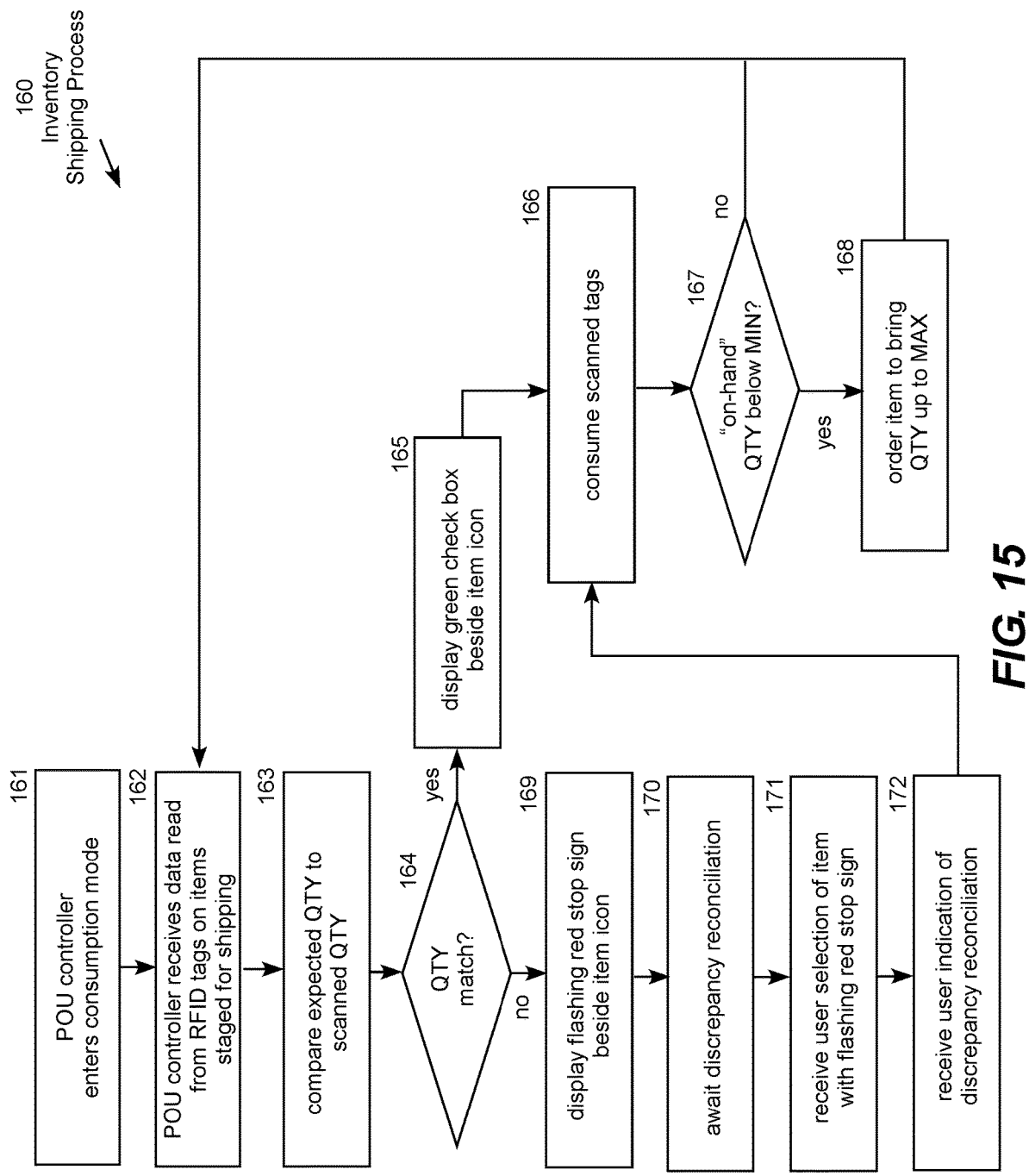
FIG. 15 is a logic flow diagram illustrating an inventory shipping process in the hub-and-spoke inventory management system.

FIG. 15 is a logic flow diagram for an inventory shipping process 160 in the hub-and-spoke inventory management system. In step 161, the cloud services platform enters a tag "consumption mode" when scanning items staged for shipping out of the facility. Step 161 is followed by step 162, in which the cloud services platform receives data read from RFID tags on items staged for shipping, typically at a loading dock or other designated shipping point. Step 162 is followed by step 163, in which the cloud services platform compares the expected quantity to the scanned quantity for a type of item, typically by comparing the ASN for the shipment to the scanned quantity. Step 163 is followed by step 164, in which the cloud services platform determines whether the scanned quantity matches the expected quantity. If the scanned quantity matches the expected quantity the "yes" branch is followed to step 165, in which the cloud services platform displays a green check beside an icon representing the scanned type of item.

Step 165 is followed by step 166, in which the cloud services platform receives a confirming user selection and "consumes" the tags for the scanned and confirmed items. Step 166 is followed by step 167, in which the cloud services platform determines whether the "on-hand" quantity for the type of item is below the MIN value designated for the type of item. If the "on-hand" quantity is below the MIN value designated for the type of item, the "yes" branch is followed to step 168, in which the cloud services platform orders a sufficient number of the items to bring the quantity up to the MAX value designated for the type of item. The cloud services platform also issues an ASN, changes the items status to "on order from hub," and may send push notifications to interested parties in accordance with configuration settings. Following step 168 and the "no" branch from step 167, the process loops back to step 162, in which the cloud services platform receives additional data read from RFID tags staged for shipping.

As an optional feature, referring again to step 164, if the scanned quantity does not match the expected quantity the "no" branch is followed to step 169, in which the cloud services platform may activate an alarm, in this example by displaying a flashing red stop sign beside the icon representing the scanned type of item. Step 169 is followed by step 170, in which the cloud services platform awaits reconciliation of the discrepancy for the type of item with an insufficient quantity staged for shipping. At this point, the user may resolve the discrepancy by locating and "scanning out" the missing quantity of type of item staged, changing the ASN to indicate a partial shipment, or take other corrective action deemed appropriate for the particular situation.

Once the user is satisfied with the reconciliation, the user selects the type of item with the red stop sign, and step 170 is followed by step 171, in which the cloud services platform receives the user's selection of an item with the flashing red stop sign. Step 171 is followed by step 172, in which the cloud services platform receives a user confirmation of discrepancy reconciliation. Step 172 loops to step 166, in which the cloud services platform consumes for the scanned tags staged for shipping previously subject to the discrepancy alarm. Step 166 is followed by steps 167 and 168, as described above.

Figure 16:
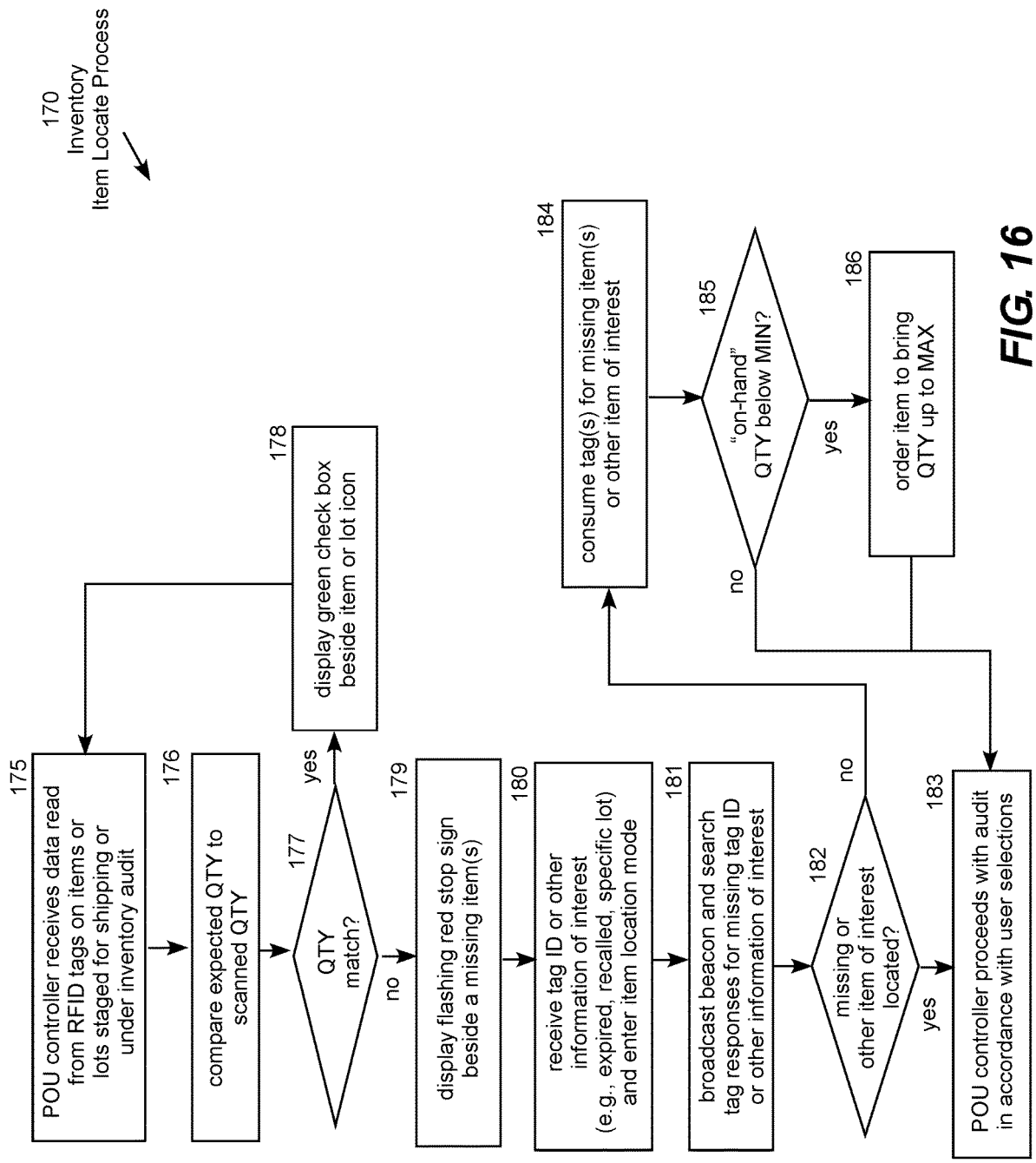
FIG. 16 is a logic flow diagram illustrating an item locate process in the hub-and-spoke inventory management system.

FIG. 16 is a logic flow diagram for an item location process 170 in the hub-and-spoke inventory management system. In step 175, the cloud services platform receives data read from RFID tags on items or lots staged for shipping or under inventory audit. Step 175 is followed by step 176, in which the cloud services platform compares the expected quantity to the scanned quantity for a type of item, typically by comparing the ASN for the shipment to the scanned quantity. Step 176 is followed by step 177, in which the cloud services platform determines whether the scanned quantity matches the expected quantity. If the scanned quantity matches the expected quantity the "yes" branch is followed to step 178, in which the cloud services platform displays a green check beside an icon representing the scanned type of item or lot. Following step 178, the process loops back to step 175, in which the cloud services platform receives additional data read from RFID tags on items or lots staged for shipping or under inventory audit. Referring again to step 177, if the scanned quantity does not match the expected quantity the "no" branch is followed to step 179, in which the cloud services platform activates an alarm, in this example by displaying a flashing red stop sign beside the icon representing the missing item or items. Step 179 is followed by step 180, in which the cloud services platform awaits reconciliation of the discrepancy for the missing item or items.

The memory on each RFID tag contains a variety of information, such as the tag identifier (tag ID or serial number), lot number, manufacturer ID, product name, product serial number, expiration date, etc. In general, a handheld or other RFID reader involved in a search for a specific tag does not need to execute sophisticated item location software, it can simply receive a tag ID or other information of interest (e.g., expired expiration date, recalled lot number, etc.) and alert the user when it discovers that particular tag ID or other information of interest, similar to a metal detector. Accordingly, kin step 180, the cloud services platform may receive one or more specific tag IDs or other information of interest, such as expired expiration dates, recalled lot numbers, specific manufacturers, etc. It should also be appreciated that any user device conducting a search is in communication with the cloud services, which can instruct as many of the fixed and/or mobile RFID readers, in one or more facilities in the system 10, to participate in a selected search. Any particular search can therefore be conducted on a multi-reader, multi-facility basis, may include multiple tag ID numbers and/or other information of interest, and be configured to continue for any time period or until the missing item is scanned into the system or the search is otherwise discontinued.

Accordingly, once the user enters a user comment to proceed with an item search based on entered criteria, step 180 is followed by step 181, in which one or more RFID readers, which may include any selection of fixed and/or mobile vehicle mounted or handheld RFID readers in one or more facilities and/or specific areas within those facilities, enters an "item locate" mode in which the readers broadcast beacons, analyze the returned RFID signals, look for the desired tag IDs or other information of interest, and alert the user when the reader identify the missing tag ID other information of interest. At this point, for example, any user in the system may resolve an ongoing audit discrepancy by physically locating and "scanning in" the missing or other items(s) of interest, as shown generally in FIG. 3. To provide a specific use case, once the user is satisfied with the reconciliation, the user proceeds with the audit, and step 181 is followed by step 182, in which the cloud services platform receives the user's selection of the missing item(s) with the flashing red stop. For those missing items that were located and scanned in, the "yes" branch is followed to step 183, in which the cloud services platform confirms the presence of the items in the POU inventory and proceeds with the audit in accordance with user selections.

Referring again to step 172, if there are missing items that were not located and scanned in, the "no" branch is followed to step 184, in which the cloud services platform received a user confirmation and consumes the tags for the item(s) confirmed as missing. Step 184 is followed by step 185, in which the cloud services platform determines whether the "on-hand" quantity for the type of item is below the MIN value designated for the type of item. If the "on-hand" quantity is below the MIN value designated for the type of item, the "yes" branch is followed to step 186, in which the cloud services platform orders a sufficient number of the items to bring the quantity up to the MAX value designated for the item. The cloud services platform also issues an ASN, changes the items status to "on order from hub," and may send push notifications to interested parties, in accordance with configuration settings. Following step 186 and the "no" branch from step 185, the process loops back to step 183, in which the cloud services platform the cloud services platform proceeds with the audit in accordance with user selections.

Figure 17:
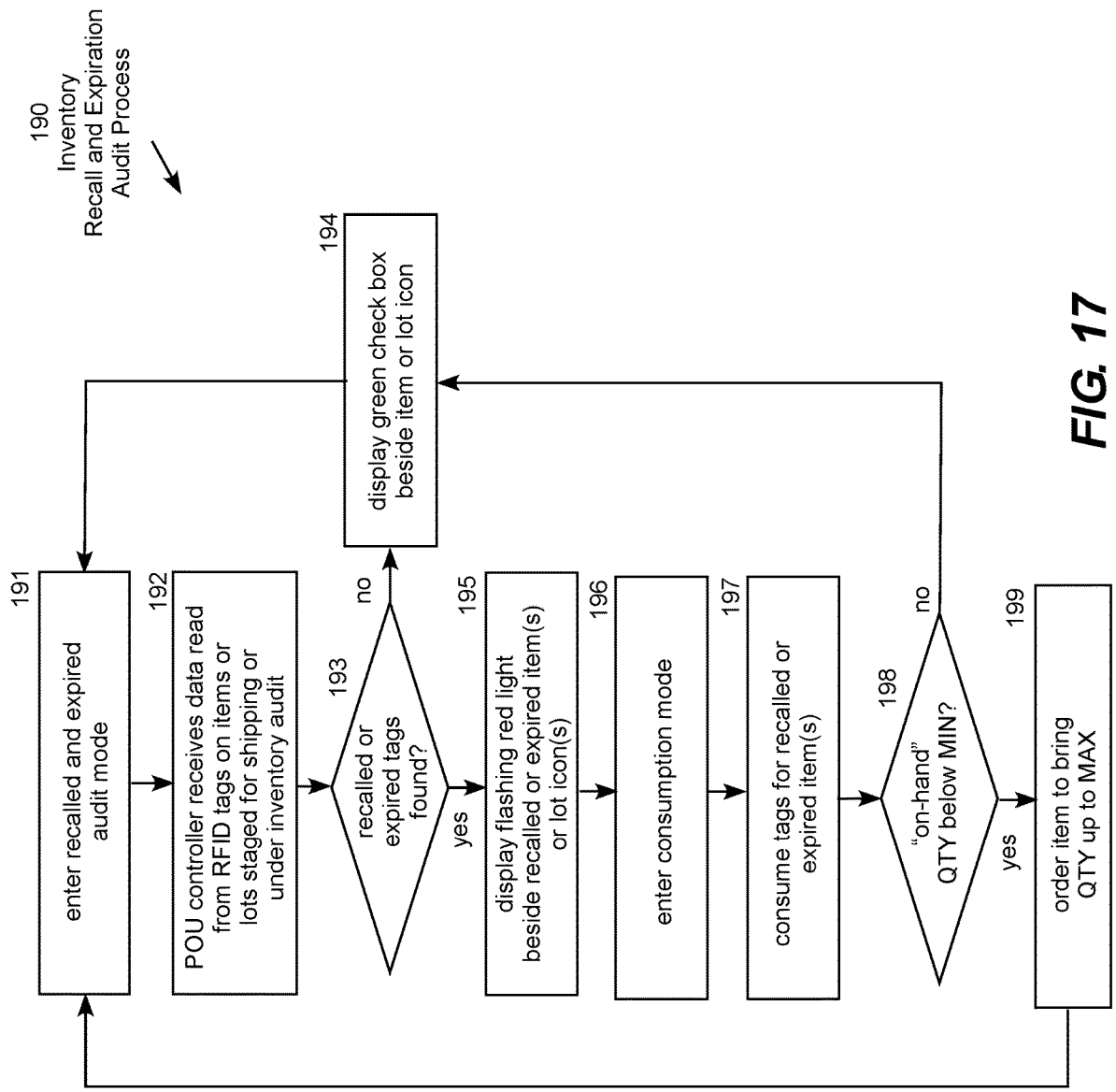
FIG. 17 is a logic flow diagram illustrating a recall and expiration audit process in the hub-and-spoke inventory management system.

FIG. 17 is a logic flow diagram for a recall and expiration audit process 190 in the hub-and-spoke inventory management system. In step 191, the cloud services platform enters a "recalled and expired audit" mode selected by the user. Step 191 is followed by step 192, in which the cloud services platform receives data read from RFID tags on items or lots staged for shipping or under inventory audit. Step 192 is followed by step 193, in which the cloud services platform determines whether the scanned items or lot includes recalled or expired items, typically by comparing the scanned RFID tags to a list of RFID tags assigned to recalled and expired item or lot numbers. If the scanned tags do not correspond to any recalled or expired tags, the "no" branch is followed to step 194, in which the cloud services platform displays green check boxes beside icons corresponding to the scanned items or lots. Following step 194, the process loops to step 191, in which the cloud services platform receives additional data read from RFID tags on items or lots staged for shipping or under inventory audit.

Referring again to step 193, if the scanned tags correspond to recalled or expired tags, the "yes" branch is followed to step 195, in which the cloud services platform activates an alarm, in this example by displaying a flashing red stop signs beside icons representing the items or lots with recalled or expired items. Step 196 is followed by step 196, in which the cloud services platform enters the "tag consumption" mode. Upon confirmation by user selection, step 196 is followed by step 197, in which the cloud services platform consumes the tags corresponding to the items confirmed as recalled or expired.

Step 197 is followed by step 198, in which the cloud services platform determines whether the "on-hand" quantity is below the MIN value designated for the type of item corresponding to the consumed tags. If the "on-hand" quantity is not below the MIN value designated for the type of item, the "no" branch is followed to step 194, in which the cloud services platform displays green check boxes beside icons corresponding to the scanned items or lots. Following step 194, the process loops to step 191, in which the cloud services platform receives additional data read from RFID tags on items or lots staged for shipping or under inventory audit.

Referring again to step 198, if the "on-hand" quantity is below the MIN value designated for the type of item, the "yes" is followed to step 199, in which the cloud services platform orders a sufficient number of the items to bring the quantity up to the MAX value designated for the item. The cloud services platform also issues an ASN, changes the items status to "on order from hub," and may send push notifications to interested parties, in accordance with configuration settings.

Those skilled in the art will recognize that it is common within the art to describe devices and/or processes in the fashion set forth in this disclosure, and then use engineering practices to integrate such described devices and/or processes into data processing systems. That is, at least a portion of the devices and/or processes described can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities).

A typical data processing system may be implemented utilizing any suitable commercially available components, such as those typically found in data computing and/or communication and/or network computing/communication systems. All of the technology described in this disclosure is suitable for implementation using commercially available computing devices, such as network servers operated by the situational awareness system and smartphones or personal computers operated by members and customers. These computing devices may be interconnected via the Internet, mobile telephone voice and data system, or other data suitable network.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermediate components. Likewise, any two components so associated can also be viewed as being "connected", or "coupled", to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

It will be appreciated that layers, features, elements, etc., depicted herein are illustrated with particular dimensions relative to one another, such as structural dimensions or orientations, for example, for purposes of simplicity and ease of understanding and that actual dimensions of the same differ substantially from that illustrated herein, in some embodiments. Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. Accordingly, the scope of the disclosure should be limited only by the claims appended hereto.

The invention claimed is:

1. A hub-and-spoke inventory management system, comprising:
one or more hub systems, each hub system installed at a respective hub facility, comprising a plurality of radio frequency identification ("RFID") tags attached to tracked items present at the respective hub facility readable by a plurality of RFID readers;
one or more point-of-use ("POU") systems, each POU system installed at a respective POU facility, comprising a plurality of RFID tags attached to tracked items present at the respective POU facility readable by a plurality of RFID readers;
a cloud services platform providing cloud services including maintaining a MIN value, a MAX value, and an item current count value for each item in inventory at each hub and POU facility;
an inter-facility communication networks interconnecting the hub systems, the POU systems, and the cloud services platform;
a plurality of user interfaces that provide access, visibility, analysis, and on-demand reporting of RFID data along with inventory management services on individual tracked item, individual hub facility, individual POU facility, and consolidated bases.

2. The hub-and-spoke inventory management system of claim 1, further comprising:
one or more supplier systems, each supplier system installed at a respective supplier facility and comprising a plurality of RFID tags attached to tracked items present at the respective supplier facility readable by a plurality of RFID readers;
wherein the inter-facility communication network interconnects the supplier systems and the hub POU systems; and
wherein the user interfaces further provide access, visibility, analysis, and on-demand reporting of RFID data on a supplier basis;
wherein the user interfaces further include supplier RFID data in the RFID data provided on a consolidated basis.

3. The hub-and-spoke inventory management system of claim 1, wherein each POU facility comprises a manufacturing plant assembling the tracked items present at the respective POU facility into finished products or assemblies.

4. The hub-and-spoke inventory management system of claim 1, wherein the cloud services include on-demand reporting of the MIN values, the MAX values, and the item current count values for tracked items on individual tracked item, individual hub facility, individual POU facility, and other consolidated bases.

5. The hub-and-spoke inventory management system of claim 1, wherein the cloud services include a system of inventory management dashboards customizable to provide the specific inventory management information pertinent for each user, hub facility, and POU facility.

6. The hub-and-spoke inventory management system of claim 1, wherein the RFID readers comprise loading dock RFID readers and storage crib RFID readers.

7. The hub-and-spoke inventory management system of claim 1, wherein the RFID readers are selected from the group consisting of:
ingress-egress RFID readers;
pole-mounted RFID readers;
ceiling-mounted RFID readers;
wall-mounted RFID readers.

8. The hub-and-spoke inventory management system of claim 1, wherein the RFID comprise mobile readers selected from the group consisting of vehicle-mounted RFID readers and handheld RFID readers.

9. The hub-and-spoke inventory management system of claim 1, wherein the RFID tags are selected from the group consisting of:
fly tags;
housing tags;
component tags located inside a housings carrying an RFID housing tag;
insert tag;
adhesive tags.

10. A hub-and-spoke inventory management system, comprising:
one or more hub systems, each hub system installed at a respective hub facility, comprising a plurality of radio frequency identification ("RFID") tags attached to tracked items present at the respective hub facility readable by a plurality of RFID readers;
one or more point-of-use ("POU") systems, each POU system installed at a respective POU facility, comprising a plurality of RFID tags attached to tracked items present at the respective POU facility readable by a plurality of RFID readers;
a cloud services platform providing cloud services including maintaining a MIN value, a MAX value, and an item current count value for each item in inventory at each hub and POU facility;
an inter-facility communication network interconnecting the hub systems, the POU systems, and the cloud services platform;
a plurality of user interfaces that provide access, visibility, analysis, and on-demand reporting of RFID data along with inventory management services on individual tracked item, individual hub facility, individual POU facility, and other consolidated bases;
wherein the cloud services platform comprises a processor and a computer readable storage medium storing non-transitory computer-executable instructions that, when executed by the processor, causes the cloud services platform to perform operations, comprising:
storing MIN and MAX values for each tracked item on-hand at a selected POU facility;
receiving RFID tag information read from the RFID tags attached to products staged for shipping out of the selected POU facility;

determining that the products staged for shipping will cause the item current count for a particular tracked item to fall below the MIN value for the particular tracked item on hand at the selected POU facility;

issuing a purchase order for a quantity of the particular tracked item to bring an on-hand quantity of the particular tracked item up to the MAX value for the particular tracked item.

11. The hub-and-spoke inventory management system of claim 10, wherein the computer-executable instructions cause the selected POU controller to perform operations further comprising:

issuing an advance shipping notice ("ASN") for the quantity of the particular tracked item ordered;

transmitting a push notification of the ASN to an interested party outside the hub-and-spoke inventory management system.

12. The hub-and-spoke inventory management system of claim 10, wherein the computer-executable instructions cause the selected POU controller to perform operations further comprising:

providing visibility of the ASN through cloud services.

13. The hub-and-spoke inventory management system of claim 10, wherein the computer-executable instructions cause the cloud services controller to perform operations further comprising:

generating an inventory management dashboard identifying the MIN value, the MAX value, and a current item count for each tracked item on-hand at the selected POU facility;

providing visibility of the MIN value, the MAX value, and the current item count for each tracked item on-hand the selected POU facility through the cloud services.

14. The hub-and-spoke inventory management system of claim 10, wherein the computer-executable instructions cause the cloud services controller to perform operations further comprising:

generating an inventory floor map identifying locations of items within a selected POU facility;

providing visibility of the inventory floor map to a paired mobile app running on a mobile device in communication with the cloud services controller.

15. The hub-and-spoke inventory management system of claim 10, wherein the computer-executable instructions cause the cloud services controller to perform operations further comprising:

generating an inventory floor map identifying locations of items within a selected POU facility;

providing visibility of the inventory floor map through the cloud services.

16. The hub-and-spoke inventory management system of claim 10, wherein the computer-executable instructions cause the cloud services controller to perform operations further comprising:

receiving an advance shipping notification (ASN) for a shipment of items sent to the selected POU identifying an expected quantity of a selected item;

receiving RFID reader information obtained from the shipment of items once it is received at the selected POU;

analyzing the RFID reader information obtained from the shipment to determine a received quantity of the selected item;

determining that a discrepancy exists between the expected quantity the received quantity of the selected item;

providing visibility of the discrepancy through cloud services.

17. The hub-and-spoke inventory management system of claim 10, wherein the computer-executable instructions cause the cloud services controller to perform operations further comprising:

transmitting an advance shipping notification ("ASN") for a shipment of finished products or assemblies to be sent from the selected POU to a customer facility identifying an expected quantity of a selected item;

receiving RFID reader information obtained from staged finished products or assemblies corresponding to the ASN;

analyzing the RFID reader information obtained from the staged finished products or assemblies to determine a staged quantity of the selected item;

determining that a discrepancy exists between the expected quantity and the staged quantity of the selected item;

activating an alarm indicating the discrepancy;

providing visibility of the discrepancy through the cloud services.

18. The hub-and-spoke inventory management system of claim 17, wherein the computer-executable instructions cause the cloud services controller to perform operations further comprising:

based on the discrepancy, identifying a specific item missing from the staged finished products or assemblies;

causing one or more RFID readers associated with the selected POU facility to search for a tag identification number received by one of the RFID readers associated with the missing item.

19. The hub-and-spoke inventory management system of claim 10, wherein the computer-executable instructions cause the cloud services controller to perform operations further comprising:

storing information identifying RFID tags associated with recalled or expired items;

receiving RFID reader information corresponding to the RFID tags associated with recalled or expired items;

activating an alarm indicating the presence of the RFID tags associated with the recalled or expired items.

20. The hub-and-spoke inventory management system of claim 19, wherein the computer-executable instructions cause the cloud services controller to perform operations further comprising:

receiving a user command selecting consumption of the RFID tags associated with recalled or expired items;

in response to the user command, consuming the RFID tags associated with the recalled or expired items to remove them from the current item counts at the selected POU facility.

* * * * *